(12) United States Patent
Elberbaum

(10) Patent No.: US 7,629,998 B2
(45) Date of Patent: Dec. 8, 2009

(54) METHOD AND APPARATUS FOR MEASURING ILLUMINATION AND CAMERA PERFORMANCES

(75) Inventor: David Elberbaum, Tokyo (JP)

(73) Assignee: Elbex Video Limited, Tokyo (JP)

( * ) Notice: Subject to any disclaimer, the term of this patent is extended or adjusted under 35 U.S.C. 154(b) by 513 days.

(21) Appl. No.: 11/159,832

(22) Filed: Jun. 23, 2005

(65) Prior Publication Data
US 2007/0002143 A1   Jan. 4, 2007

(51) Int. Cl.
*H04N 17/00* (2006.01)
(52) U.S. Cl. .................................. 348/187; 348/188
(58) Field of Classification Search ................ 348/175, 348/176, 187, 188
See application file for complete search history.

(56) References Cited

U.S. PATENT DOCUMENTS

| | | | | |
|---|---|---|---|---|
| 4,507,683 | A * | 3/1985 | Griesshaber et al. | 348/722 |
| 4,513,318 | A * | 4/1985 | Wilensky et al. | 348/181 |
| 4,951,141 | A * | 8/1990 | Fischer | 348/187 |
| 4,962,425 | A * | 10/1990 | Rea | 348/187 |
| 4,991,007 | A * | 2/1991 | Corley | 348/188 |
| 5,267,038 | A * | 11/1993 | Fister | 348/191 |
| 5,291,102 | A | 3/1994 | Washburn | |
| 5,732,293 | A * | 3/1998 | Nonaka et al. | 396/157 |
| 5,793,656 | A * | 8/1998 | Richmond et al. | 708/230 |
| 5,805,218 | A * | 9/1998 | Ohura et al. | 348/353 |
| 6,292,617 | B1 * | 9/2001 | Neyman | 386/42 |
| 6,542,185 | B1 * | 4/2003 | Bogardus | 348/223.1 |
| 7,068,302 | B2 * | 6/2006 | Ebenstein et al. | 348/187 |
| 7,301,559 | B2 * | 11/2007 | Imamura et al. | 348/185 |
| 2002/0080246 | A1 | 6/2002 | Parulski | |
| 2004/0032496 | A1 | 2/2004 | Ebenstein | |
| 2004/0080627 | A1 * | 4/2004 | Kroll et al. | 348/221.1 |

OTHER PUBLICATIONS

International Preliminary Report on Patentability dated Jan. 10, 2008 and a Written Opinion of the International Searching Authority dated Oct. 29, 2007, for corresponding International Application PCT/US2006/016268.

International Search Report dated Oct. 29, 2007, from the corresponding International Application.

* cited by examiner

*Primary Examiner*—Victor R Kostak
(74) *Attorney, Agent, or Firm*—Katten Muchin Rosenman LLP

(57) ABSTRACT

A method and apparatus for measuring the performances of a camera including illumination, signal levels, signal to noise ratio, resolution, spectrum, color vectors and displaying the measured values in alphanumeric, waveforms, graphs and vectors onto a displayed scene generated by a camera under test, thereby enabling the user to better comprehend the meaning and verify the camera specifications and their fitness.

20 Claims, 10 Drawing Sheets

FIG. 4
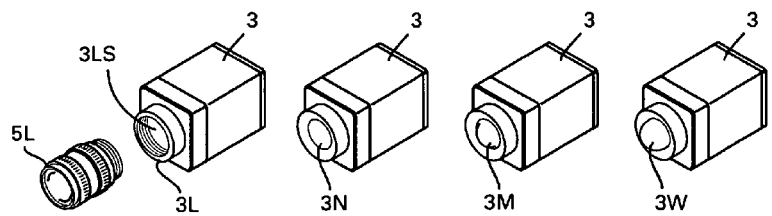
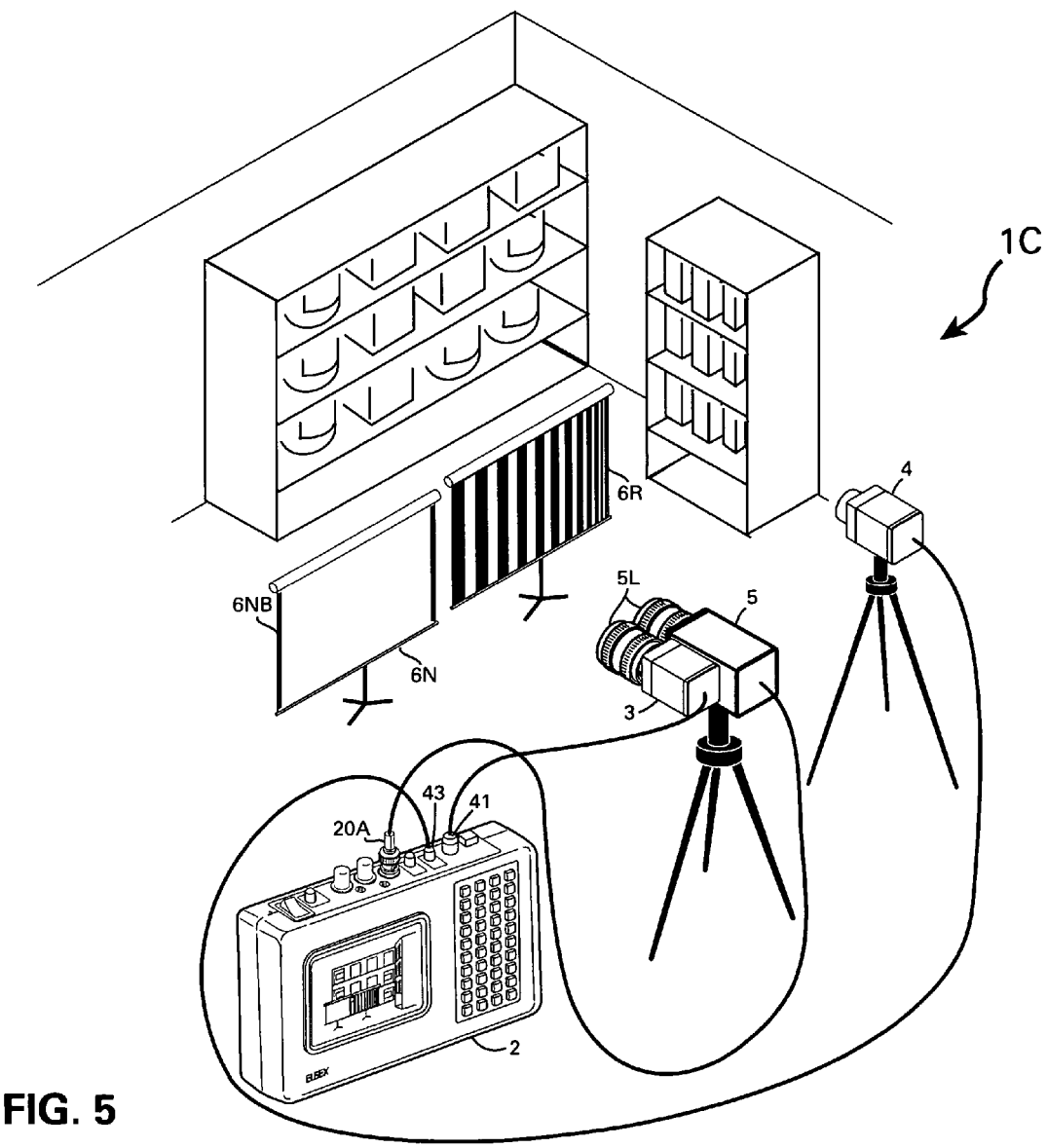
FIG. 5

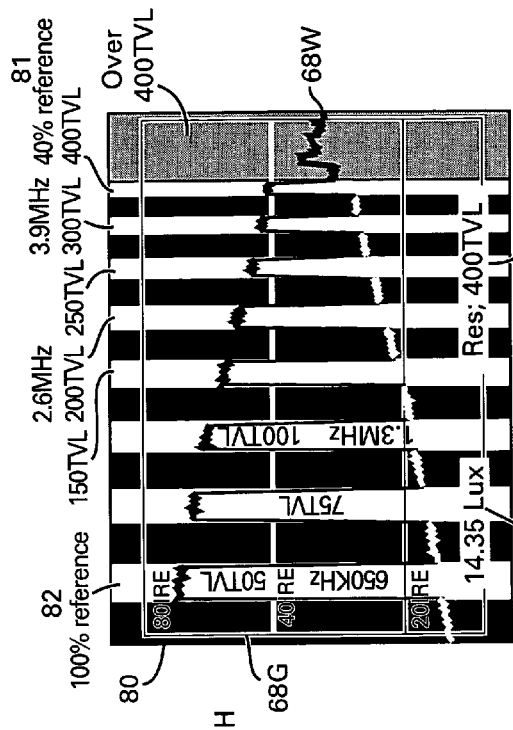
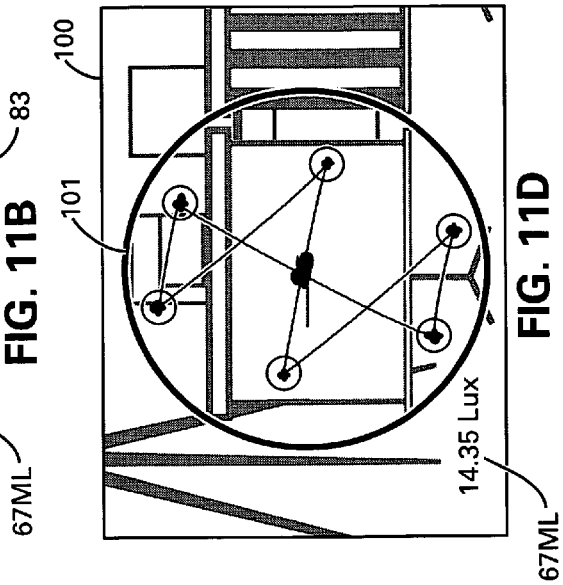
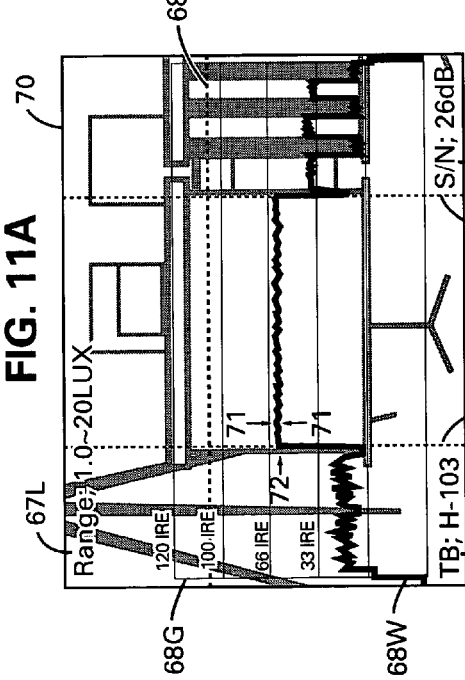
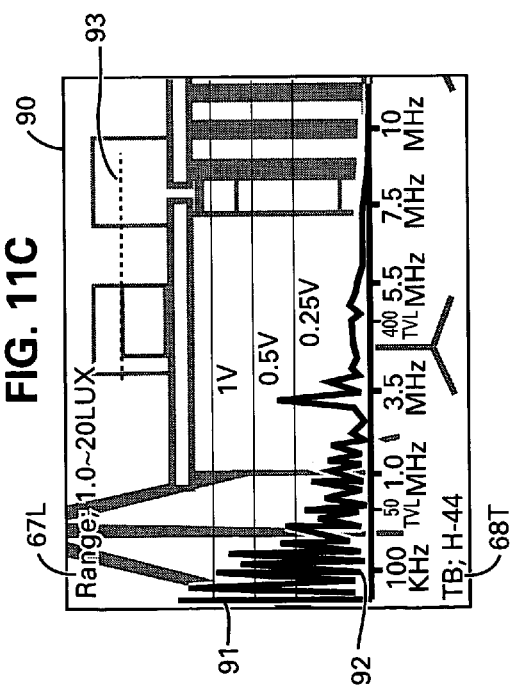
FIG. 11A
FIG. 11B
FIG. 11C
FIG. 11D

METHOD AND APPARATUS FOR MEASURING ILLUMINATION AND CAMERA PERFORMANCES

BACKGROUND OF THE INVENTION

1. Field of the Invention

This invention relates to measurement of light and illumination and the performances of digital or analogue cameras such as sensitivity and signal waveforms, signal to noise ratio, resolution and spectrum.

2. Description of Prior Art

The performances of CCTV, Web cameras and other television and digital cameras are measured in laboratories by a variety of test equipment, such as illumination meters, waveform oscilloscope, vectorscope and signal to noise meter by using standard illuminators, light boxes and charts. Normally, the conditions under which the measurements should or are performed are laboratory environment as defined, for a given performance measurement, by national or international institutions such as EIA, ISO, CCIR, SMPTE or other standards. For example signal to noise ratio is measured with the camera exposed to equally distributed 2000 Lux over a reflecting white plane.

Such measurements under controlled environment are proper, however because many of the inter-relations between light, illumination, bandwidth, noise and signal levels are not specified or subject to a cover-all standard, the potential users of such cameras cannot accurately comprehend the performance on the basis of the printed specifications, particularly when the specified figures relate to an unknown and/or undefined scene environment or scene content. Thus, the only practical references available to the potential users for selecting a camera are the comparisons between the published data sheets by the different manufacturers, the result of which is that the performances of cameras in the field do not match the user's expectation.

This gap between user's expectation and the actual performance of purchased cameras causes confusion and bewilderment. Moreover, the confusion caused by misinformation as to the true performance of cameras, as referred to in the camera's data sheets and specified figures of performances, are practically impossible to verify. This persisting state of misinformation enabled some manufacturers to take advantage of the market by publishing non-realistic performance figures. To avoid legal and other challenges, the non-realistic performances are commonly conditioned on complex terms and terminologies known only to professionals in the camera field. The result of all this is that many cameras are specified in catalogs and data sheets with unrealistic performance figures which causes great harm and losses to the unsuspecting users of security and similar cameras.

SUMMARY OF THE INVENTION

It is an object of this invention therefore to provide a method and apparatus for measuring accurately the fundamental performance items of analogue or digital, still or live cameras by a portable test equipment, in the field, where the cameras are intended to be placed or operated, for superimposing the measurement and graphs onto a display of a scene as generated by the camera under test and for highlighting the measured item within the display itself. Thereby providing the means to comprehend the meaning of the specified items and their figures.

The method and apparatus for measuring illumination according to the present invention uses a pre-adjusted light sources, such as LEDs, in candela units for providing accurate controlled illumination of white light in the visual spectrum and in the UV or IR regions such as the 850 nm wave length.

The candela is the standard unit of the luminous intensity (I) known also as candlepower, established and recognized by all national and international institutions. When the illuminated surface is at a distance (d) of 1 meter from the light source, the surface is illuminated with 1 Lux, which is the established and recognized unit of illumination.

The illumination (E) is defined by the well known formula $E=I/d^2$, wherein E=1 Lux when I=1 candela and d=1 meter. The illumination is a fundamental item to represent camera performance and the terms "minimum scene illumination" or "minimum illumination" are of the most important specification items of a camera, and are commonly specified in Lux figures or fractions thereof.

The photometry including the measurement of illumination must take into account the human eye's spectrum, because the human eyes are unable to see radiated light in the infrared or the ultra violet regions, therefore the agreed upon Lux unit by the International Commission of Illumination (CIE) is based on the properties of human eyes, by a defined visual spectrum graph, with 555 nm (green) wavelength at its peak.

Therefore, all the illumination testers for photography and other visual light application use a pass filter for allowing only the visual spectrum to reach the light sensing device of the illumination meter or tester and cut out any and all lights in the IR or the Ultra violet regions. By this the illumination meter will show "0" Lux for any light generated in the IR region, regardless of the light intensity.

For correctly measuring IR illuminated scene and the sensitivity of a camera to an IR illuminated and/or UV illuminated scene the method and apparatus of the present invention employs interchangeable filters comprising a visual spectrum pass filter and a given specific filter such as 850 nm or several given UV or IR wavelength pass filters, along with providing interchangeable pre-adjusted light source units for generating controlled and calibrated lights in candela value within the visual spectrum, the UV and the IR wavelength, matching said corresponding interchangeable pass filters. The pre-calibrated light sources thereby provide for illuminating the observed scene in the visual spectrum, and the selected UV or IR wavelength. This make it possible to verify the illumination level in a standard Lux value for the visual spectrum, and a specific lux value, such as IR Lux, or UV Lux for the selected wavelength.

The illumination sensor of the present invention includes light sensing device such as pin diode, for generating an electrical signal output that is relative to the amount of light radiated onto the sensor when it is exposed to an illuminator (primary light source such as the LED) or to a secondary light source, such as a reflected light from an object or a scene, through a diffusing filter or a diffuser. The diffusing filter in a dome shape, flat or other spherical shape can be made of acryl, polycarbonate and other plastic or glass materials in milky white tint for the visual spectrum or in a tint corresponding to a selected UV or IR bandwidth for diffusing the incoming light of the selected bandwidth of the illuminator used for the measurement.

The measurement of illumination described above applies only to radiated light in open space or free air, it does not apply to light passing through lenses because the lens magnification power decrease or increase the distance from the light source or the scene to be observed optically.

Also, the ratio of a light entering a lens to the light exiting the lens is dependent upon the lens aperture known as "f"

number. The passing light will decrease inversely with the square of the f number, or passing light=$1/f^2$. Therefore, to provide for actual measurement of a term known as "face plate illumination", the light sensor assembly of the present invention further includes interchangeable lens mount for enabling the mounting of a lens into the light path of the light sensor.

The generated output signal from the light sensor is processed by an analog to digital converter and by a CPU for generating digital, numerical or a colored graph of the measured illumination, for displaying the measurement values, graph or both and/or superimposing the values or graph onto a display of an observed scene.

The apparatus of the present invention includes a video input circuit for connecting a camera under test and an LCD or other display monitor for displaying an image generated by the tested camera. The display circuits include a circuit for superimposing onto the displayed scene, as generated by the camera under test, the values of the measured illumination as measured by said illumination sensor and a memory circuit for storing the image with the superimposed value of the measured illumination, and for enabling the user to move the illumination sensor onto different positions within the observed scene and for superimposing plurality of measured illumination values at the position they were measured over the entire scene or an illumination graph, representing the overall illumination of the observed scene and to position the light sensor with an attached lens under test, side by side with the camera and the lens under test, for measuring and superimposing also the actual face plate illumination value. Such complete, coverall display with superimposed values or graph provide the user with unambiguous illumination values inside an actual display of the scene generated by the camera under test.

It is similarly possible to change the illuminators from visual spectrum to UV or IR illuminator with specific bandwidth and to repeat the steps described above for generating similar scene displays under UV or IR illuminated conditions.

The apparatus of the present invention further includes a circuit for measuring the inputted video signal in mV and in IRE values and for outputting the measured values in digital, numeric or a graph known as waveform to said superimposing circuit for superimposing the video signal waveform and/or numeric value onto said scene display generated by the camera under test. The CPU and the memories include a program to generate a grid display, representing the signal levels in mV/IRE and the time base in horizontal or vertical period units, fed to the superimposing circuit for adding the grid to the displayed waveform.

The well known IRE values (defined by the Institute of Radio Engineers) are the standard signal level for broadcasting television signal.

The IRE scale for the 1V P-P is equal to 140 IRE, wherein 100 IRE represents 0.714V video (maximum luminance signal) and the 40 IRE represents 0.286V sync level.

The measuring of a camera sensitivity, as defined by SMPTE which govern the video broadcast industry standards, calls for exposing the camera to 2000 Lux of uniformly lighted white light and close the iris of the lens until the camera signal outputs non saturated 100 IRE of video signal. Because this measurement is complex and not simple to comprehend by users, the sensitivity specifications of cameras in the general market stipulate a Lux value at which the camera will generate 100 IRE of video signal when used with a stipulated f number (of a lens). However, because the generated signals by the pickup device are amplified by an AGC amplifier the 100 IRE value can be obtained by a very high gain AGC amplifier, even though the non amplified pickup device signals can be far lower, such as only 5 IRE.

Therefore, by superimposing the video signal waveform measured in IRE or mV units onto the display of a picture taken by the camera under test will provide the user with unambiguous picture reality, with illumination in Lux and signal in mV and IRE values on top of the displayed picture. Moreover, the superimposing circuit provides for highlighting the selected horizontal line or period of the display for which the signal waveform is superimposed.

By this the display of the picture taken by the camera under test can include the many different Lux values, the signal waveform in IRE and/or mV value and the highlighted horizontal line or period for which the signal waveform is displayed, giving the user comprehensive data pertaining the illumination and the signal levels, all superimposed onto the display of a picture taken by the camera under test with the selected lens.

Another very important measurement data to compile the presentation of the camera basic performances is the signal to noise ratio (S/N). The broadcast standard for signal to noise ratio (S/N) calls for measuring the noise when the camera is exposed to 2000 Lux of uniformly lighted white light with the lens aperture (IRIS) set such that a flat 100 IRE, non saturated signal is obtained. During S/N measurement all the amplifiers such as AGC amplifiers and video signal processing circuit, such as gamma circuit and others are all switched off. By such setup, the noise is riding on a clean white, flat level of 100 IRE or 0.714 of video signal and can be measured with accuracy. The measured signal to noise ratio is specified in dB, such as 46 dB or 48 dB.

S/N measurement can be carried by two steps, first the measuring of the peak white signal of a camera positioned against 2000 Lux lighted test chart, (with all the video signal amplifiers and processors switched off) proceeded by comparing the measured peak white signal to a black level noise, measured when the lens is capped, e.g. with no light penetrating the pickup device.

Both known measurements do not provide a practical information as to the S/N of a camera, considering that the camera's high gain AGC amplifier and other video signal processing circuit are active and are generating internal noise, particularly under low light conditions.

The method and apparatus of present invention provides for measuring the S/N by placing reflecting screen inside the measured scene for measuring both, the noise riding on top of, and the level of a "white" signal that corresponds to the light reflected by said screen and comparing the level of the noise measured with the level of said "white" signal, for generating the actual S/N figure in dB and for superimposing the S/N value into the display, to provide real practical means for the user to comprehend the meaning of S/N value.

Because the reflecting screen may not cover the entire observed scene as observed by the camera under test, it is necessary to set borders for the measurement of the S/N of said "white" signal, such that the S/N measurement will apply only to the portion of signal representing the reflected light by the screen. Accordingly said superimposing circuit further provides for setting and superimposing border lines onto the superimposed signal waveform, for defining the portion of the waveform between the two border lines. Thereby, the S/N measurement is confined to the signal generated by the reflected light from the white reflecting screen only, and is not influenced by other signals generated by reflected light outside the screen.

The method for measuring the resolution of a camera in TVL (TV lines) is to position the camera against 2000 Lux illuminated resolution test chart and review the chart displayed on a monitor for identifying the resolving power of the camera with a lens. The resolution can be further verified through the video signal waveform, wherein the resolution limit is reached when a given signal, out of the sweep signals corresponding to the resolution chart, is attenuated to 40% level in relation to the signal level corresponding to the 50 TVL resolution. The level of the 50 TVL base signal will be close to 100 IRE.

In contrast a resolution chart illuminated by 10 lux or below will result with rounded signal edges and with substantially generated noise, this will affect mostly the higher resolution. Further under lower illuminations the 50 TVL signal level will be far lower than the 100 IRE and thus, the attenuated higher frequency signal, attenuated to 40% in ratio to the 50 TVL signal, will equal the noise level and thus, reducing the overall resolution of the camera.

Therefore, to correctly measure the camera resolution in the field, the present invention provides for a sweep frequency or step frequency screen, calibrated in TVL, for placing the screen into the scene viewed by the camera under test, for measuring the camera's resolution in the field under the actual illumination of the scene the camera is intended for. The camera should be positioned at a distance such, that the display will cover the entire sweep frequency or step frequency (bar) screen. And with the waveform superimposed onto the display for verifying the resolution in TVL.

Another important performance item of a camera is the camera's pickup device and the circuitries' spectrum. A well known spectrum analyzer generates signal level graph in its Y axis, against a frequency range or band in its H axis. Such graph of a camera positioned against sweep frequency test chart, clarifies the linearity of the camera processing and amplifying circuits and the noise that they generate, along with the overall camera performances including resolution, contrast and color levels.

Here too however, the measuring of the camera's spectrum under good illumination such as 2,000 lux does not correctly describe the frequency spectrum of a camera exposed to low level of illumination. Under low illumination level the high gain AGC amplifier is operated at its full gain in combination with other processing circuitries, all of which cause harmonics, noises and other unwanted non linear performances. For this purpose the present invention provides for superimposing frequency spectrum graph onto the display of a scene as generated by the camera under test, enabling the user to fully understand what to expect from a given camera.

The accuracy of the color signals, vectors and level, are greatly influenced by light levels and particularly on the type of the illuminators used, the spectrum of the illuminators and the color temperature of the illuminated environment of a scene. Vectroscope is well known test equipment to measure color signal accuracy and color signal levels in a laboratory environment, however, the well known vectroscopes do not provide for superimposing color vectros onto the display of a scene as generated by a camera under test.

A color signal decoder of the apparatus of the present invention will generate all the data pertaining the chrominance signals, such as the chrominance signal of NTSC, PAL or digital video signals, include any of the well known J-PEG or M-PEG compression variations feeds the data to a CPU for processing the data into a well known vectroscope display, for superimposing the color vectros onto the scene display generated by the camera under test.

For providing a practical, small size and light weight tester for the many described different measurements and more, the apparatus of the present invention uses high speed, powerful CPU processor, along with a range of high capacity and speed field memories, high capacity flash ROM and SRAM devices and employs FPGA device which can be formed into different circuits combinations by a software program.

Because of the memory capacity and the high power CPU the apparatus of the present invention is further provided with a software program for generating color chart, Retma chart, resolution chart, gray scale chart and other well known charts used in the television industry. The charts can be individually recalled for display on the LCD screen and for generating chart signals for testing monitors, recorders such as VHS or digital recorders and/or for combining chart signals along with the camera under test signals for testing the camera system's other devices and/or the cabling connecting the camera to a control center and for providing a PC connected to the tester the data and references for comparisons of test chart signal and the camera signal.

Further, the method and apparatus of the present invention provides for transmitting the display with all the superimposed data, along with other particular of the measurements, such as tables and lists of the measured data to a printer or to a PC for data storing and for printing out the measurement results. The PC may include a program for remotely controlling the tester of the present invention and/or for generating reports, graphs, waveforms, vectors and other data pertaining the tested camera in details.

The tester further provides for distributing the display signals to a remote monitor to offer better resolution of a large size monitor because of the small LCD size used with portable tester, which is inherently (by size) having lower resolution and/or to prevent the tester display from generating light into a very dark or total darkness scene under test.

By all the above, it will become clear that the method and apparatus of the versatile tester of the present invention for measuring light and camera performances offers the true means to verify the very important specification items of camera performances.

BRIEF DESCRIPTION OF THE DRAWINGS

The foregoing objects and features of the present invention will become apparent from the following description of the preferred embodiment of the invention with reference to the accompanying drawings, in which:

FIG. 4 is an illustration of the illumination sensor of the preferred embodiment with interchangeable diffusers of the present invention;

FIG. 5 is an illustration of a setup of the preferred embodiment for measuring and verifying the face plate illumination by the tester of the present invention.

FIG. 11A is a display of a waveform superimposed onto a scene including S/N measuring screen of a preferred embodiment of the present invention;

FIG. 11B is a waveform superimposed onto a display of a resolution chart of a preferred embodiment of the present invention;

FIG. 11C is a display of a spectrum graph superimposed onto a display generated by a camera under test;

FIG. 11D is a vectorscope display of a color accuracy superimposed onto a display generated by a camera under test;

DETAILED DESCRIPTION OF THE PREFERRED EMBODIMENTS

Figure 1:
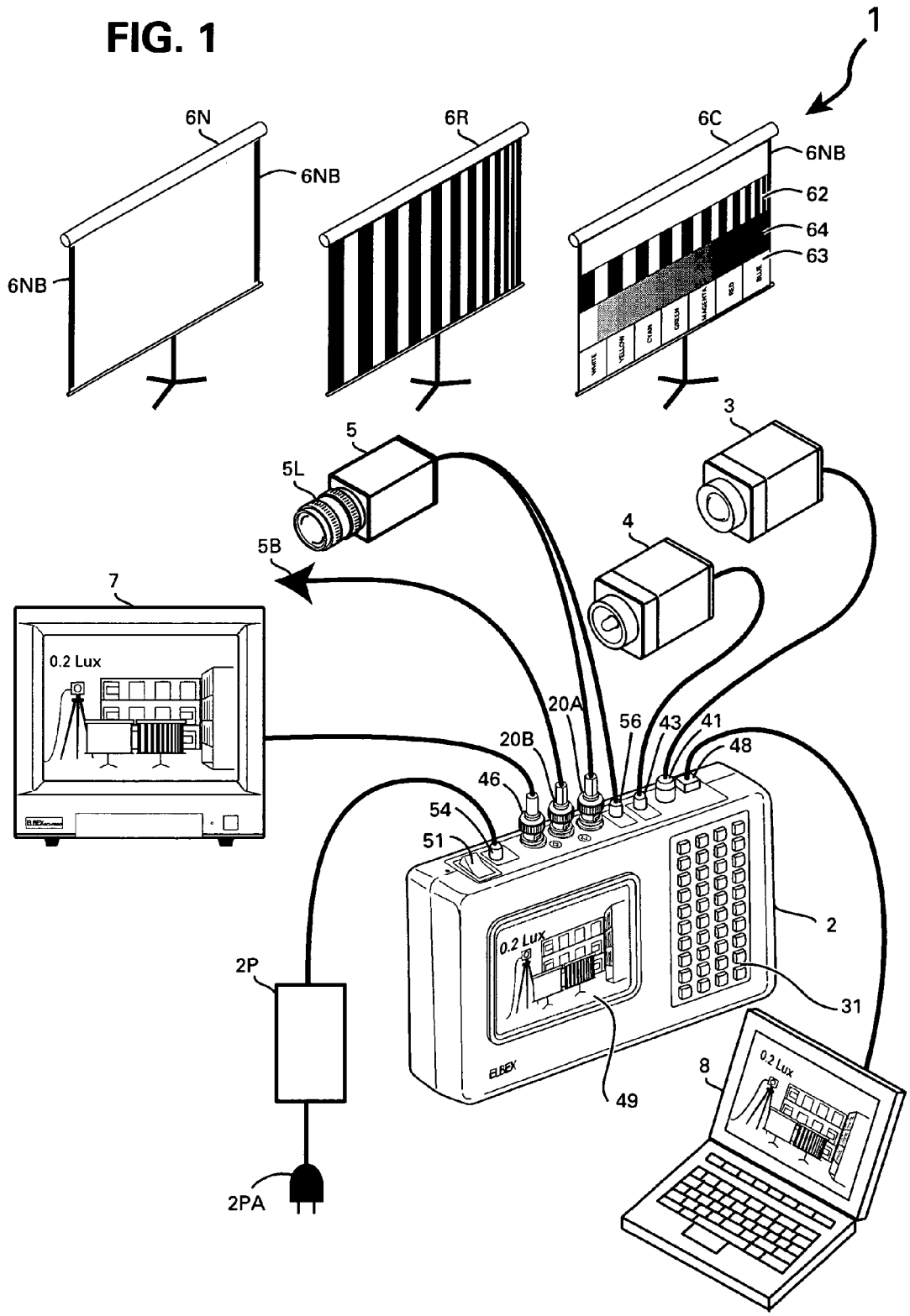
FIG. 1 is an illustration of a tester for measuring illumination and camera performances of the preferred embodiment, including the accessories and attachments for the tester of the present invention.

FIG. 1 shows an apparatus 1 for measuring the performances of a camera 5 with an attached lens 5L, comprising a camera tester 2, illumination sensor 3, pre-calibrated light source 4, optional monitor 7, external PC 8, white reflecting screen 6N, a resolution chart 6R and a combined test chart 6C. The tester 2 includes keys 31, LCD display 49, video signal buffer output 5B and a power supply 2P. The power supply 2P may also be a battery charger for charging a rechargeable battery such as NiCd (Nickel Cadmium), not shown, that may be included inside the tester 2. By this arrangement the tester can be used in places or sites with no power outlet to become fully portable. The NiCd batteries and/or the power supply 2P may also power the camera 5 under test and as shown in FIG. 1 the camera 5 is connected to the video input connector 20A and to the power connector 56.

The connector 20B provides buffered video output to 5B, which may be a peripheral equipment related to the testing procedure or to a system to which the camera 5 is connected to, or intended to be connected to. The PC 8 is connected via a communication line to the communication line connector 48, which may be a network connector, or a connector known as USB or D sub connector for communicating data and protocols such as RS232 or RS422 and similar. The PC 8 may be installed with a program for remotely controlling the tester 2, for processing the testing and for storing the data generated by the tester 2.

Similarly the PC 8 may include video processing circuit and may be used for displaying the video signals superimposed with testing data and for generating printout signals of the video signals generated by the camera 5 under test, along with the test data superimposed onto the displayed object or scene and/or for displaying and/or printing the video signal and the data separately. Further, the tester 2 shown as a stand-alone unit can be constructed as a plug-in card for insertion into a PC slot (not shown) or embedded into a PC.

The remote monitor 7 is connected to the video output connector 46 for remotely displaying the test procedure and results. The use of remote monitor 7 has several important aspects, such as using larger screen size for providing better resolution, versus the small size LCD 49, it also allows for persons that are not directly processing the test at the site to view remotely the actual testing results and procedures. Further, for testing the sensitivities of cameras in a very low light or low illumination environment, the LCD 49 may become a light source within the scene and thereby influence the test result. In such instances it is better to switch off the LCD 49 and replace it by a remote monitor such as monitor 7 that is viewed during the test, but does not influence the test.

The white reflecting screen 6N, the resolution chart or the resolution screen 6R and/or the combined chart 6C are used for measuring S/N, resolution and as will be explained later the camera's spectrum. The illumination sensor 3 and the pre-calibrated light source 4 are connected to the connectors 41 and 43 respectively as shown in FIG. 1 and in the setup 1A shown in FIG. 2, which is a setup for measuring and verifying the light source and the illumination measurement accuracy.

Figure 3:
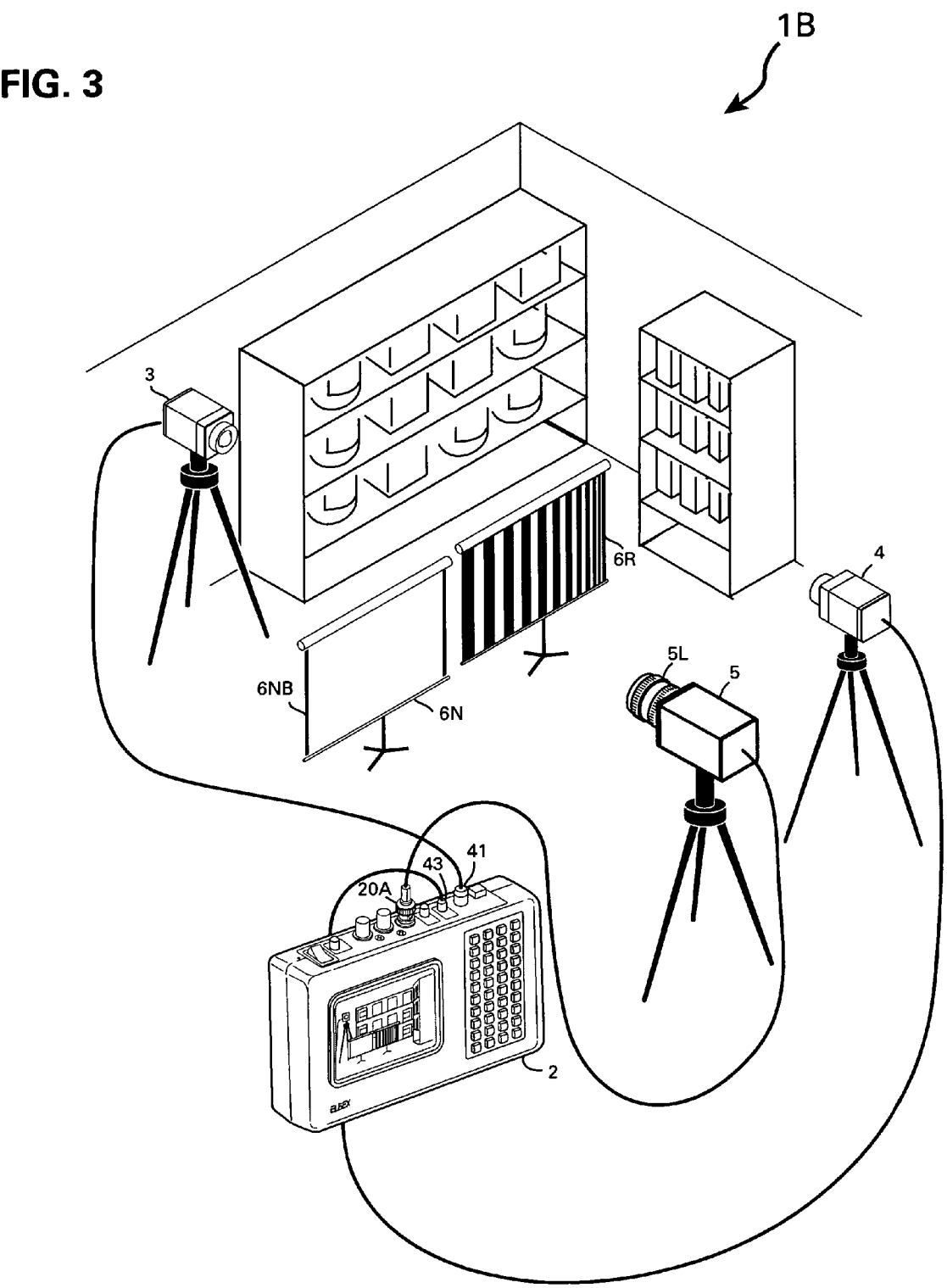
FIG. 3 is an illustration of a setup for measuring camera performances by the tester of the preferred embodiment including accessories of the present invention.

The method and apparatus for measuring illumination according to the present invention uses pre-calibrated light source 4 for illuminating the scene 1B of FIG. 3, using illuminating devices such as LED or light bulb, calibrated to radiate light (luminance intensity) in candela units.

The candela is the standard unit of the luminous intensity (I) known also as candlepower, established and recognized by all national and international institutions. One candela of radiated light by a device, such as light bulb or LED, is approximately the amount of light energy as will be radiated by an ordinary, common candle. When the light radiating device is a point source, such as the LED, and the illuminated area surrounding the point source is a spherical surface at a distance (d) of 1 meter from the light source, the entire portion of the spherical surface is illuminated with 1 Lux, which is the established and recognized unit of illumination. The illumination (E) is defined by the well known formula $E=I/d^2$, wherein the illumination decreases inversely with the square of the distance, and wherein E=1 Lux when I=1 candela and d=1 meter. The illumination is a fundamental item to represent camera performance and the terms "minimum scene illumination" or "minimum illumination" are of the most important specification items of a camera, and are commonly specified in Lux figures or fractions thereof.

While light energy like other radiated energy can be measured by pure physical means as it applies to radiometry, the photometry including the measurement of illumination must take into account the human eye's spectrum. This is because the human eyes are unable to see radiated light in the infrared or the ultra violet regions, therefore the agreed upon Lux unit by the International Commission of Illumination (CIE) is based on the properties of human eyes, by a defined visual spectrum graph, with 555 nm (green) wavelength at its peak.

Therefore, all the illumination testers for photography and other visual light application use a pass filter for allowing only the visual spectrum to reach the light sensing device of the illumination meter or tester and cut out any and all lights in the IR or the Ultra violet regions. By this the illumination meter will show "0" Lux for any light generated in the IR region, regardless of the light intensity. This is very important for the security market, wherein many cameras will operate under what may be seen as total darkness, but in fact the scene is well illuminated by an IR light source.

For correctly measuring IR illuminated scene and the sensitivity of a camera to an IR illuminated and/or UV illuminated scene the method and apparatus of the present invention employs interchangeable filters comprising a visual spectrum pass filter and a given specific or several UV or IR wavelength pass filter, such as 850 nm.

For this reason the tester 2 may be provided with plurality of pre-calibrated light sources 4 for generating controlled and calibrated lights in candela units within the visual spectrum, the UV and the IR wavelength and with interchangeable corresponding pass filters for passing light to the illumination sensor in the visual spectrum, the UV and the IR wavelength. The use of visual spectrum or a selected specific UV or IR wavelength illuminators and filters makes it possible, by positioning the illuminators 4 against the sensors 3 at a precise distances, in meters, to read and verify the illumination level in a standard Lux value for the visual spectrum, and a specific lux value, such as IR Lux, or UV Lux for the specific selected wavelength, such as 850 nm.

The illumination sensor 3 of the present invention includes light sensing device such as pin diode, for generating an electrical signal output that is relative to the amount of light radiated onto the sensor when it is exposed to an illuminator (primary light source such as the LED) or to a secondary light source, such as a reflected light from an object or a scene, through a diffusing filter or a diffuser.

The diffusing filters in a dome shape 3W, flat 3N or other spherical shape 3M shown in FIG. 4 can be made of acryl, polycarbonate and other plastic or glass materials in milky white tint for diffusion the incoming visual spectrum light rays in all directions. The use of dome shape diffuser 3W is to diffuse lights reflected from wider angle, such as 60° or more, for matching wide-angle camera observation conditions. A flat diffuser 3N is used for measuring a narrow angle of a light such as for measuring primary light source, while varying spherical shapes 3M can be employed for diffusing reflected light rays from varying angles of a scene. Diffusing filters for UV or IR illumination measurements can be made of acryl, polycarbonate and other plastic or glass materials in a tint corresponding to a selected UV or IR bandwidth for diffusing the incoming light of the selected bandwidth of the illuminator used for the measurement.

The measurement of illumination described above applies only to radiated light in open space or free air, it does not apply to light passing through lenses. This is firstly because of the lens magnification power, for example wide-angle lens or telephoto lens depending on which, the distance from the light source or the angle of the scene to be observed is optically decreased or increased.

Further, the ratio of a light entering a lens to the light exiting the lens, or the decrease in the light passing through a lens and reaching the face plate of the camera pickup device such as CCD or CMOS device, is dependent upon the lens aperture known as "f" number. The passing light will decrease inversely with the square of the f number, or passing light=1/$f^2$. For example with f2 the passing light will be $\frac{1}{2}^2=\frac{1}{4}$ e.g. only 25% of the light entering the lens will reach the faceplate of the camera's pickup device. Therefore, to provide for real, true measurement of a term known as "face plate illumination", it is necessary to mount a lens onto the light sensor.

Accordingly the light sensor 3 of the present invention further includes interchangeable lens mount 3L shown in FIG. 4 for enabling the mounting of variety of lenses such as the lens 5L into the light path of the light sensor 3, thereby providing for measuring a primary light or a light reflected from a given scene through the lens 5L intended to be used with a test camera 5 as shown in FIG. 5. The lens mount 3L includes a built-in diffusing filter 3LS, calibrated such that the measured illumination values will read the exact illumination of a faceplate of the camera pickup device such as a CCD or CMOS device. The built-in diffusing filter 3LS can be milky white for visual spectrum or can be selected for a specific UV or IR wavelength, such as 850 nm, which is commonly used for IR surveillance.

Figure 7:
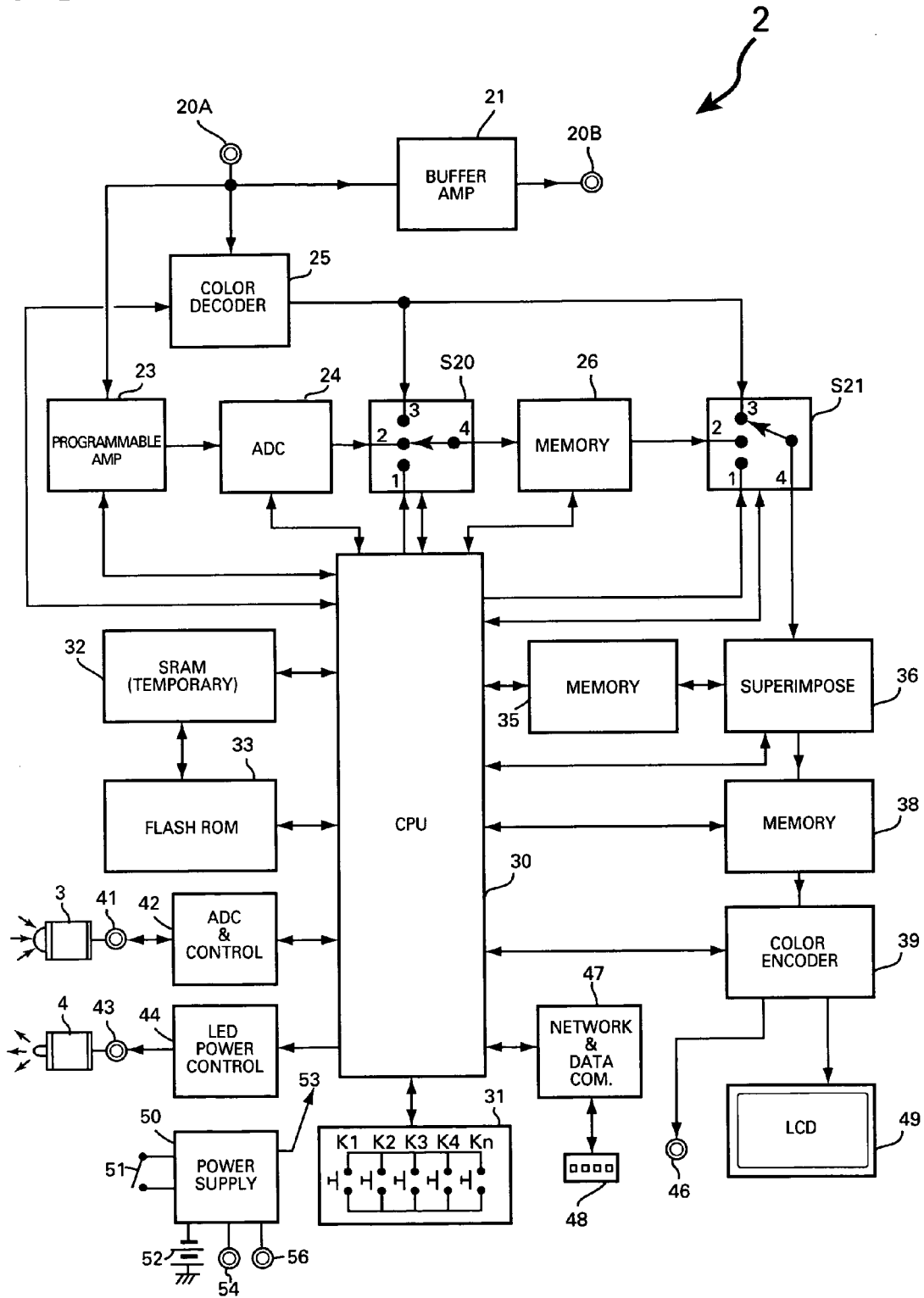
FIG. 7 is a general block diagram of the tester for measuring illumination and camera performances of the preferred embodiment of the present invention.

Shown in FIG. 7 is the electrical block diagram of the tester 2 including the illumination sensor 3 and the pre-calibrated light source 4. The block diagram of the tester 2 shown in FIG. 7 is the overall block diagram covering all circuit options and signal path options for measuring and testing the different items of camera 5 specifications, light and illuminations.

The well known circuits of the tester 2 include CPU 30, SRAM 32, Flash ROM 33, Field memories 26, 35 and 38, superimpose circuit 36, color encoder 39, color decoder 25, programmable amplifier 23, buffer video amplifier 21, analog to digital converter 24, routing switches S20 and S21, network & data communication processor 47, LCD display monitor 49 and select keys 31. The tester 2 further include the connectors 20A, 20B, 46 and 48 that are explained later, an analog to digital converter and control circuit 42 for the illumination sensor, the illumination sensor connector 41, power control circuit 44 for the calibrated light source and the calibrated light source connector 43.

The power supply circuit 50 includes a NiCd battery or other rechargeable battery 52, power switch 51, power input connector 54, power line 53 for powering the tester 2 with the sensor 3 and the pre-calibrated light source 4 and a power connector 56 for powering a camera under test. The buffer amplifier 21 feeds buffered video signal through the connector 20B for connecting other peripheral equipment to the tested camera and/or provide for connecting the test equipment to an existed system without disturbing the system while testing the camera performances. Many of the circuits of the tester 2 are incorporated into a single device such as the well known gate array or FPGA IC device that can be formed into many circuit combinations through software programs, or embedded into the device through masking. The routing switches S20 and S21 shown as a contact switch can be any well known digital, analog or data switch that are selected and controlled by the CPU 30.

Figure 2:
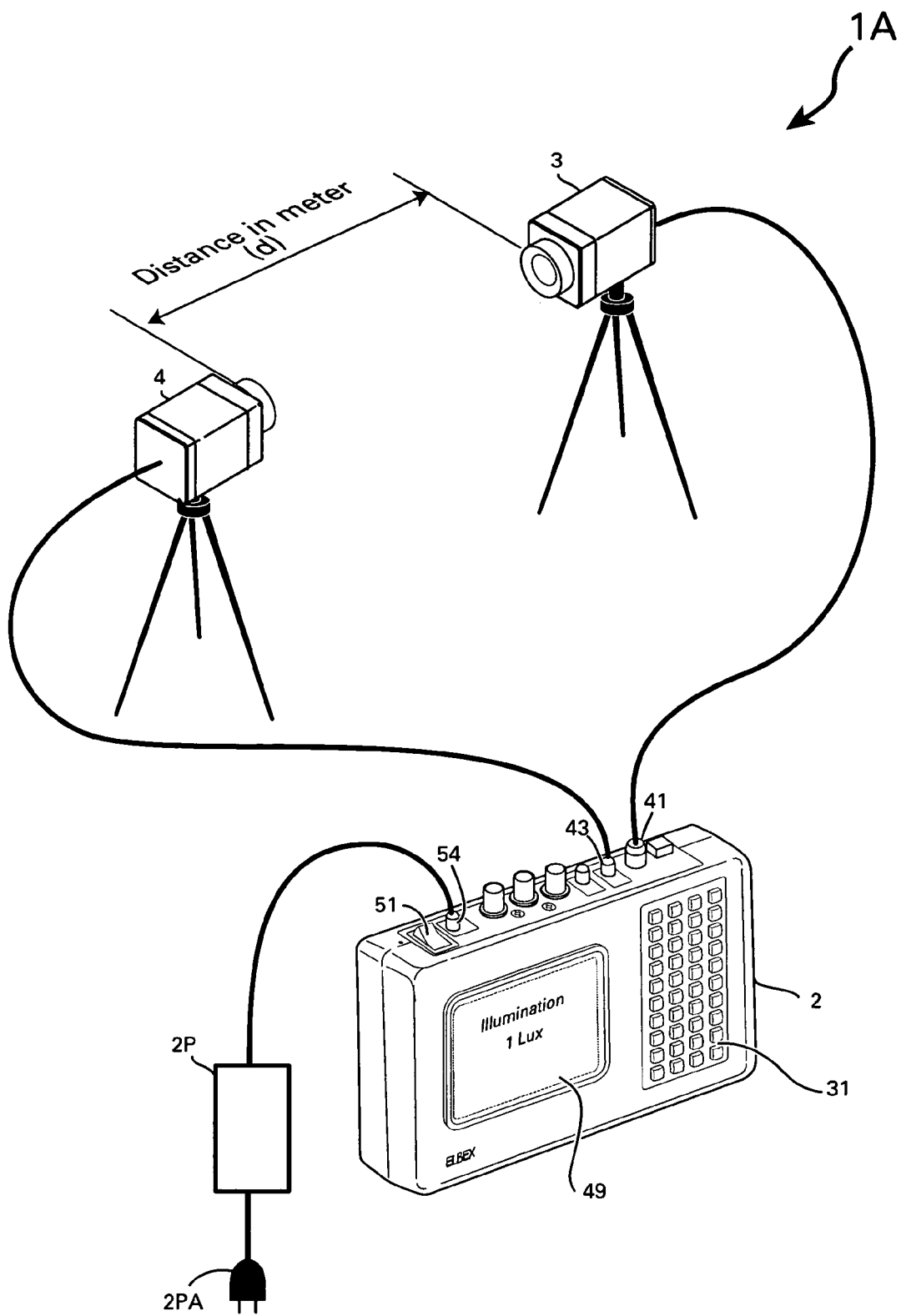
FIG. 2 is an illustration of a setup for measuring and verifying the illumination by the tester of the present invention.
Figure 8:
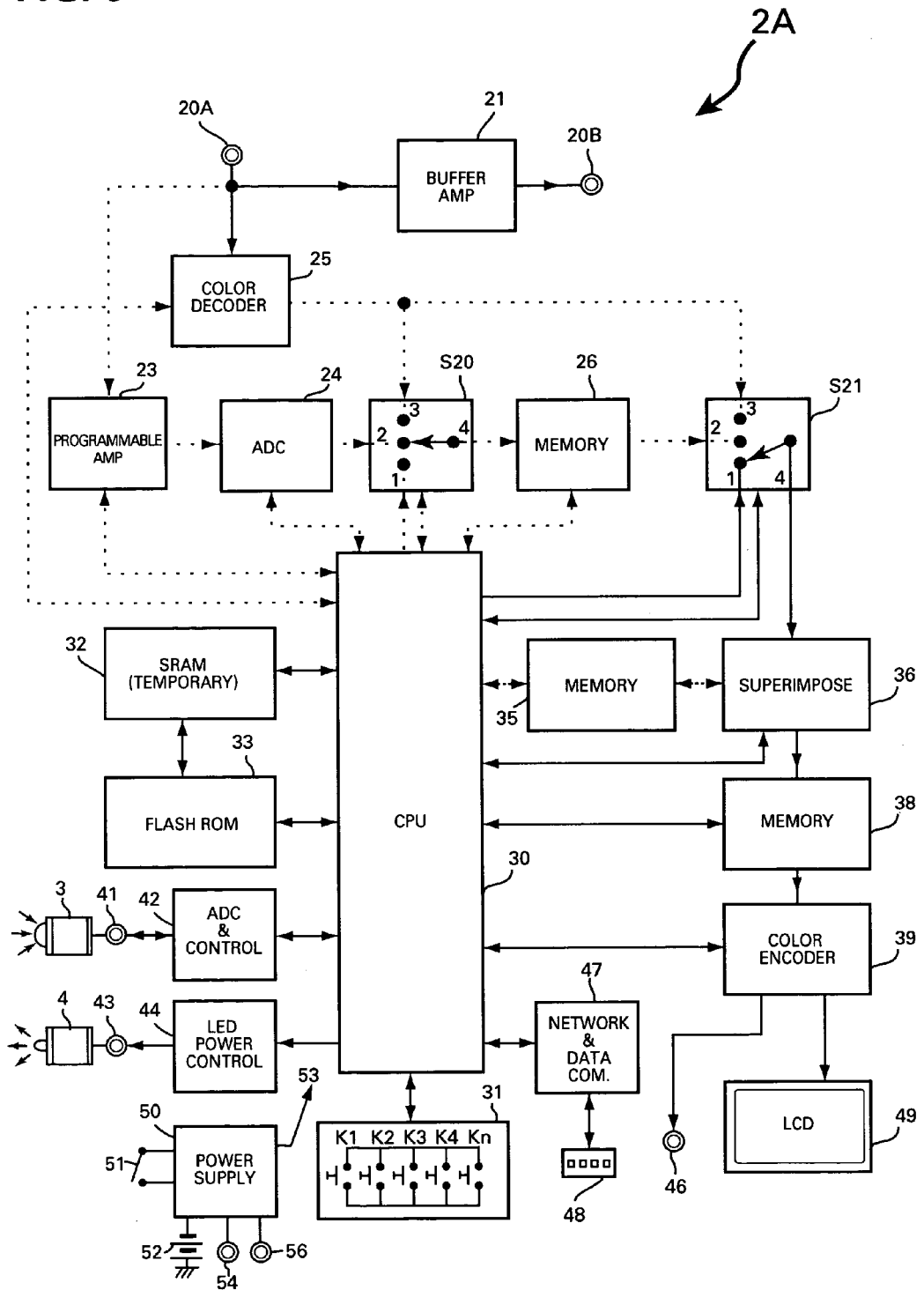
FIG. 8 is a block diagram shown in FIG. 7 showing the active circuits for the measurement of illumination.

FIG. 8 shows the electrical block diagram portion of the tester 2 selected to the calibration setup mode 1A shown in FIG. 2, via the select keys 31. The CPU 30 commands the signal routing switches S20 and S21 and activates the different circuits as programmed for the selected test mode. Active circuits of the tester in the calibration testing setup mode 1A as shown in FIG. 2 include the analog to digital converter and sensor control circuit 42 and the LED power control circuit 44, both of which are shown as circuits within the tester 2, but can be included inside the sensor assembly 3 and the calibrated light source assembly 4 respectively. The control circuit portion of the circuit 42 can be any of the many well known circuit for signal level or range selection, including voltage dividers, comparators, biased controlled or programmed amplifier and more, all of which can be used for selecting the scale of the measured illumination in steps, for providing measurement ranges such as 0.01~0.1 Lux, 0.1~1 Lux, 1~10 Lux, 10~100 Lux, 100~1,000 Lux, 1,000~10,000 Lux etc. The scale selection can be programmed to operate in automatic mode on the basis of the measured value in Lux or in manual mode through the selection keys 31.

The power control circuit 44 controls the current and/or the voltage applied to the LED or to a light bulb of the light source 4. Because of the substantial tolerances in light radiation by light bulbs, such as incandescent, fluorescent or other bulbs and/or by the LEDs, it is necessary to pre calibrate such standard light sources that are used for measuring apparatuses in a proper laboratory conditions. For this purpose the control circuit 44 includes EPROM device, programmed individually to provide accurate control data to each individual light source 4. The well known EPROM is programmed to control the current fed to the LED or the voltage applied to a bulb or both the current flow and the voltage applied using well known programmable current and/or voltage control circuits. The power control circuit 44 is shown in FIG. 8 as a circuit within the tester 2, however in practice a power control circuit, similar to the circuit 44 is included in every light source 4 that is provided as an accessory to the tester 2. By such arrangement, the program for the EPROM of the power control circuit is simplified for controlling only its individual LED or bulb, while an EPROM of a power control circuit 44 as shown in FIG. 8 will need to be programmed for interchangeable light source units 4, which require more complex controlling means to ensure that each interchangeable light source 4 is correctly controlled to radiate standard candela units of luminous intensity.

Further, the well known CPU device 30 commonly incorporates an analog to digital converter and the ADC and control circuit 42 shown as a separate circuit in FIG. 8 may not be needed and may not be used, in which case the connector 41 will be directly connected to the CPU 30.

Figure 6:
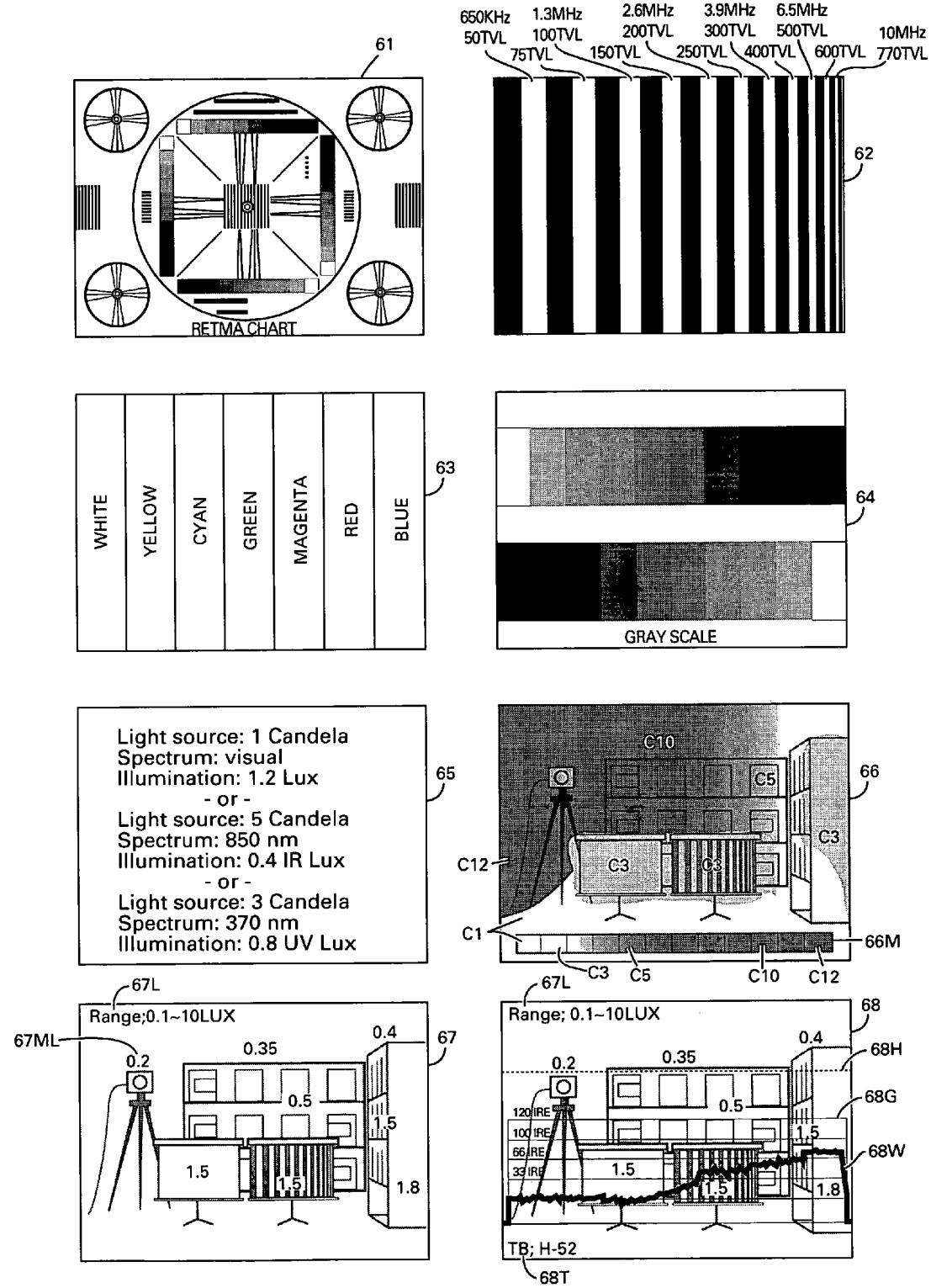
FIG. 6 are charts, displays and graphs as generated by the tester of the present invention.

The digital output of the digital to analog converter 42 is fed to the CPU 30 for processing the received digital data and for outputting and displaying the measurement details in Lux values as shown in the display 65 or in a colored graph shown in the display 66 of FIG. 6 onto the LCD 49 and/or onto a remote monitor 7 and/or onto the PC 8 shown in FIG. 1. For this purpose the CPU feeds the processed measurement detail data directly to the well known color encoder 39 for outputting a display signal to the LCD 49 and to the remote monitor output 46. The color encoder 39 encodes the output signals of the memory 38 into well known display signals, such as NTSC or PAL and/or VGA or VGX etc. Simultaneously, the CPU 30 feeds the processed data to the well known network and data communication circuit 47 for feeding the data through the data connector 48 to a remote PC 8 shown in FIG. 1.

The routing switch S21 shown in FIG. 8 is positioned to connect terminal 1 with the output terminal 4 of the switch S21 through a command by the CPU 30, on the basis of the mode selected by keys 31. The keys K1, K2, K3, K4 and Kn of the select keys 31 can be a set of mechanical switches, rubber pad switches, or touch screen or combination thereof connected to the CPU 30 for commanding, processing and selecting modes, testing ranges, measurements readings, displays, store and playback commands, inputting testing details, positioning of testing particulars, controlling the communication to and from a PC and any other operation and testing function as used by a common keyboard of a PC.

As explained above, the tester can be a plug-in unit of a PC or a build-in circuit and/or a program for installation into a PC. By such arrangement the CPU 30, the memories 26, 35 and 38, the SRAM 32 and the flash ROM 33 along with other circuits such as the analog to digital converters 24 and 42 and/or the color decoder 25, the color encoder 39 and the superimposing circuit 36 can be replaced by circuits or programs incorporated in the PC, including the LCD 49 which can be an LCD display of a laptop PC, while the keys 31 can be replaced with a programmed standard keyboard of a PC.

Shown in FIG. 2 is the setup 1A for illumination range and accuracy verification, in which the sensor 3 is positioned in a precise distance D measured in meters, from the pre-calibrated light source 4. For example, if the light source 4 is pre-calibrated to 1 candela and the distance D is 1 meter, the reading of the tester 2 will be 1 Lux. By changing the distance D it will be simple to verify the values of the tester 2 readings by applying the formula $$E = \frac{I}{d^2}.$$

By changing the illuminators 4 to IR or UV illuminators and the corresponding filters of the sensor 3 to match the spectrum of the illuminators and inputting the illuminators and filters data through the keys 31, the reading of the tester 2 will correspond to IR Lux or UV Lux as shown in the display 65 of FIG. 6.

As the pre-calibrated light sources 4 radiate standard light in candela units the tester 2 is provided with adjustments and calibration of the sensor 3 for reading for example, precise 1 Lux at a distance of 1 meter (for 1 candela) and 0 Lux when the sensor 3 is cupped. The calibration procedure is commanded through the keys 31, which also command the storing of the calibration data, the measuring data and the graphs. For storing and replay of the illumination data, the tester 2 shown in FIG. 8 set to calibration and illumination measurement mode 2A, employs the SRAM 32 for temporary storing the signal in process, flash ROM memory for storing the data and the field memory 38, which stores the display signals within the display circuits.

The processed and measured illumination data can be fed to the superimpose circuit 36 directly from the CPU 30 or via the routing switch S21 for superimposing values onto illumination graph 66 shown in FIG. 6, which is fed by the CPU 30 to the field or frame memory 38. Alternatively the CPU 30 may feed directly a complete superimposed graph or data or both to the color encoder 39. The color encoder 39 generates display signals for displaying the illumination data, graph or both onto the LCD display 49.

Figure 9:
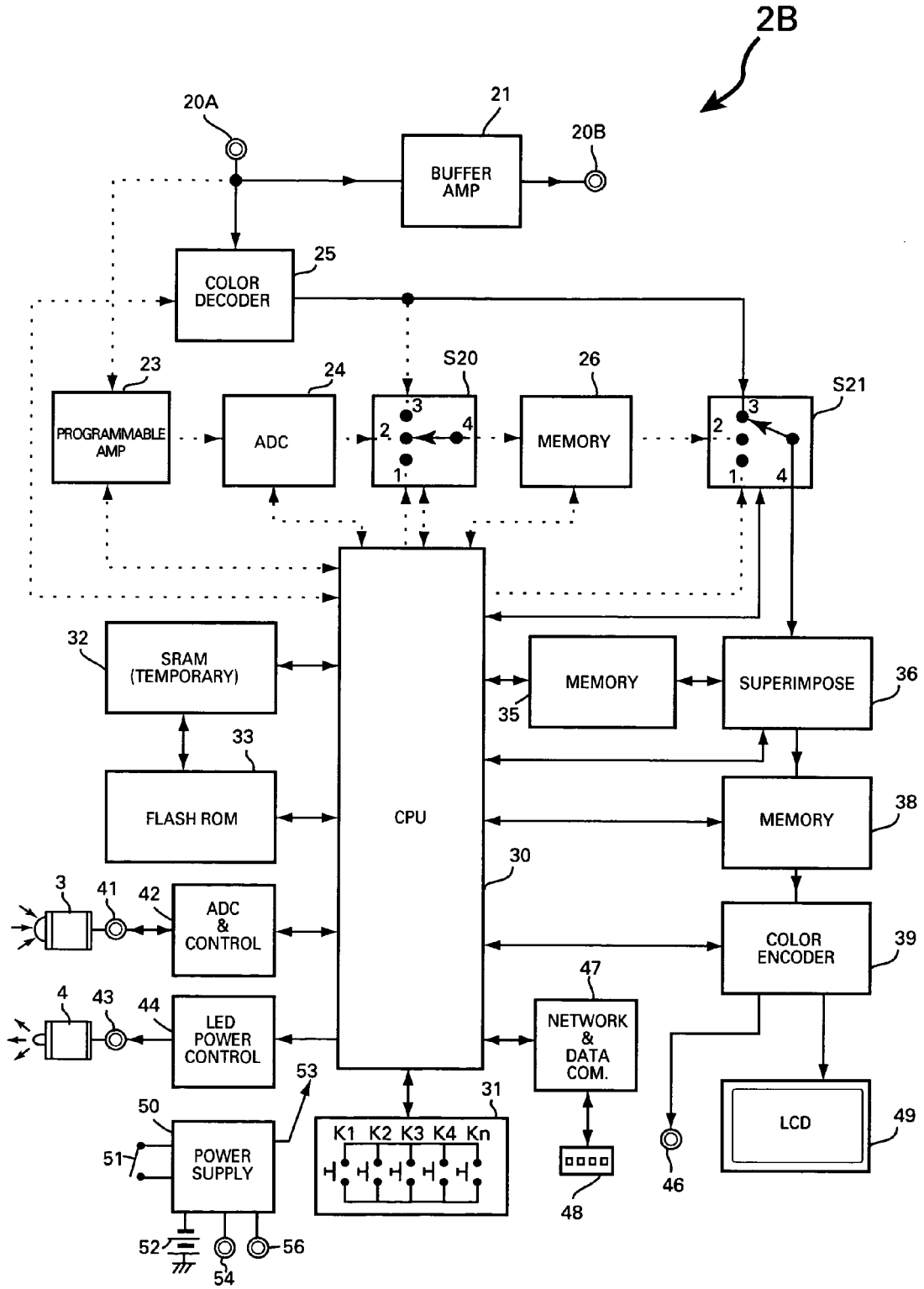
FIG. 9 is a block diagram shown in FIG. 7 showing the active circuits for processing, superimposing and displaying graphs of the measurement.

The block diagram 2B of the tester 2 of the present invention shown in FIG. 9 set to illumination superimpose mode 1B shown in FIG. 3, includes a video input 20A and a color decoder 25 for feeding the signal of a camera under test through the routing switch S21 to the display circuit chain including the superimpose circuit 36, field memory 38 and color encoder 39 for displaying an image generated by the tested camera onto the LCD 49 and/or onto remote display monitor through the remote monitor connector 46. The superimpose circuit 36 of the display circuit chain is for superimposing onto the displayed scene, as generated by the camera under test, the values of the measured illumination 67ML shown in the display 67 of FIG. 6 as processed by the CPU 30 on the basis of the signal level outputted from the illumination sensor 3. The memory circuit 38 stores the image with the superimposed value of the measured illumination. The illuminator 4 shown in FIG. 3 can be used for illuminating a scene if the scene shown in the setup 1B is in total darkness, alternatively the illuminator 4 is not needed when the illumination measurements accuracies are checked for calibration and are O.K.

The tester 2 includes SRAM 32 for temporary storing the displayed picture and the superimposed values of the illumination by shifting the stored display between the memory 38 and the SRAM 32 via the CPU, for enabling the user to move the illumination sensor 3 into different positions within the observed scene, for superimposing onto the stored display additional measured illumination values 67ML at the position they were measured over the entire scene, one position after another using up-down-left-right keys of the keys 31, as well as the measuring range in Lux 67L, thereby providing overall illumination of the observed scene as shown in the display 67 of FIG. 6

The color decoder 25 also feeds its output to the field or frame memory 26 for storing the decoded signals. The decoded signals include data pertaining all the individual pixels of the generated field or frame signals generated by the camera 5 under test, all of which is fed to the CPU 30. The CPU 30 uses the data pertaining the pixel timing for introducing Lux level values on the basis of the plurality of the measured illuminations into the pixel layout, as coordinated through the left-right-up-down keys of the keys 31 at the time of measuring, and uses the combined Lux values and the pixel layout to form a graded color graph made of graded colors C1 up to C12 shown in the display 66 of FIG. 6. For better presentation of the display it is preferable to display the scene in B/W, overlaid with a graded color graph C1~C12 for representing the overall illumination of the entire scene, supplemented with a graded color bar 66M for providing the user with illumination scale in Lux ranges (not shown) for easy reference. The graded color graph is fed to the memory 36 for overlaying the graph onto the B/W display. The color encoder 39 is commanded to encode the scene display in B/W and outputs the encoded signal to the LCD 49 and to a remote monitor through the connector 46. Simultaneously the CPU 30 output the processed data and the display through the network/data communication processor 47 to the data connector 48 for feeding the display and the measurement data to a remote PC 8 shown in FIG. 1.

It is further possible, according to the present invention, to position the light sensor 3 with an attached lens 5L under test, side by side along with the camera 5 under test with the lens 5L as shown in the setup 1C of FIG. 5, for measuring and superimposing the face plate illumination value onto the stored display, thereby, superimposing all the illumination data pertaining to a scene onto a display generated by a camera under test while observing the scene, including the face plate illumination value of the tested camera 5.

Even though FIG. 5 shows that two lenses 5L are used in the face plate illumination measurement, one attached to the camera 5 and one to the illumination sensor 3, only one lens can be used for the measurement. The circuits of the tester 2 provide for shifting of displays that are stored in the memories 26, 35 and 38 to the SRAM 32 back and forth and therefore the display generated by the camera 5 under test can be shifted from the memory 38 to be temporary stored in the SRAM 32. During this temporary storing the lens 5L can be removed from the camera and installed onto the sensor 3 for measuring the face plate illumination and for superimposing the measured value of the face plate illumination onto the display, after the stored display is transferred back to the memory 38. By such arrangement the face plate illumination measurement can be carried with only one lens 5L and not as in the test setup shown in FIG. 5 with two identical 5L lenses.

Such comprehensive displays with superimposed Lux values or a graph, provides the user with unambiguous illumination values inside an actual display of the scene generated by the camera under test, based on which the user can make a sensible decision on the fitness of the camera and/or the lens. Similarly the user can verify the specifications and their fitness to the actual illumination level at the site.

A Flash ROM 33 or other storage/memory device such as HDD, SD card or a memory stick incorporated in the tester 2 can store multiple displays superimposed with the measured illuminations values, including the face plate illumination in Lux. The Flash ROM 33 can store multiple displays superimposed with the many illumination measured values along with other measurements and graphs. The multiple stored displays can also be used for comparison purposes of the test results, such as comparing the stored pictures of the same images, tested under different illumination levels and/or different illuminators. For this purpose the Flash ROM 32 can be fed with the displayed data directly from the SRAM 32 or via the CPU 30. Similarly, the Flash ROM 33 can be fed with the displayed picture and the illumination values separately, through the CPU 30 from the memories 26, 35 and 38. The memories 26, 35 and 38 shown in FIG. 7 FIG. 1 as separate memories, such as well known single packaged field or frame memory IC can be a larger single memory device that is segmented into three or more separate memories, addressed through the CPU 30, the CPU controlled routing switches S20 and S21, or both the CPU 30 and the routing switches S20 and S21.

The flexibility of shifting stored data to and from the Flash ROM 33, the SRAM 32 and the memories 26, 35 and 38 provides among the many other functions, for repeating the measuring steps described above for visual spectrum, but with UV or IR illuminator, for generating identical or similar scene displays under UV or IR illuminated conditions, with all the measurements superimposed with the measured illuminations throughout or separately displayed, giving the user an unambiguous multi picture data and displays to compare, review and verify all the illumination variations possibilities against each other and their fitness to the intended use of a camera and/or the lens and/or the correctness of the published camera specifications.

Figure 10:
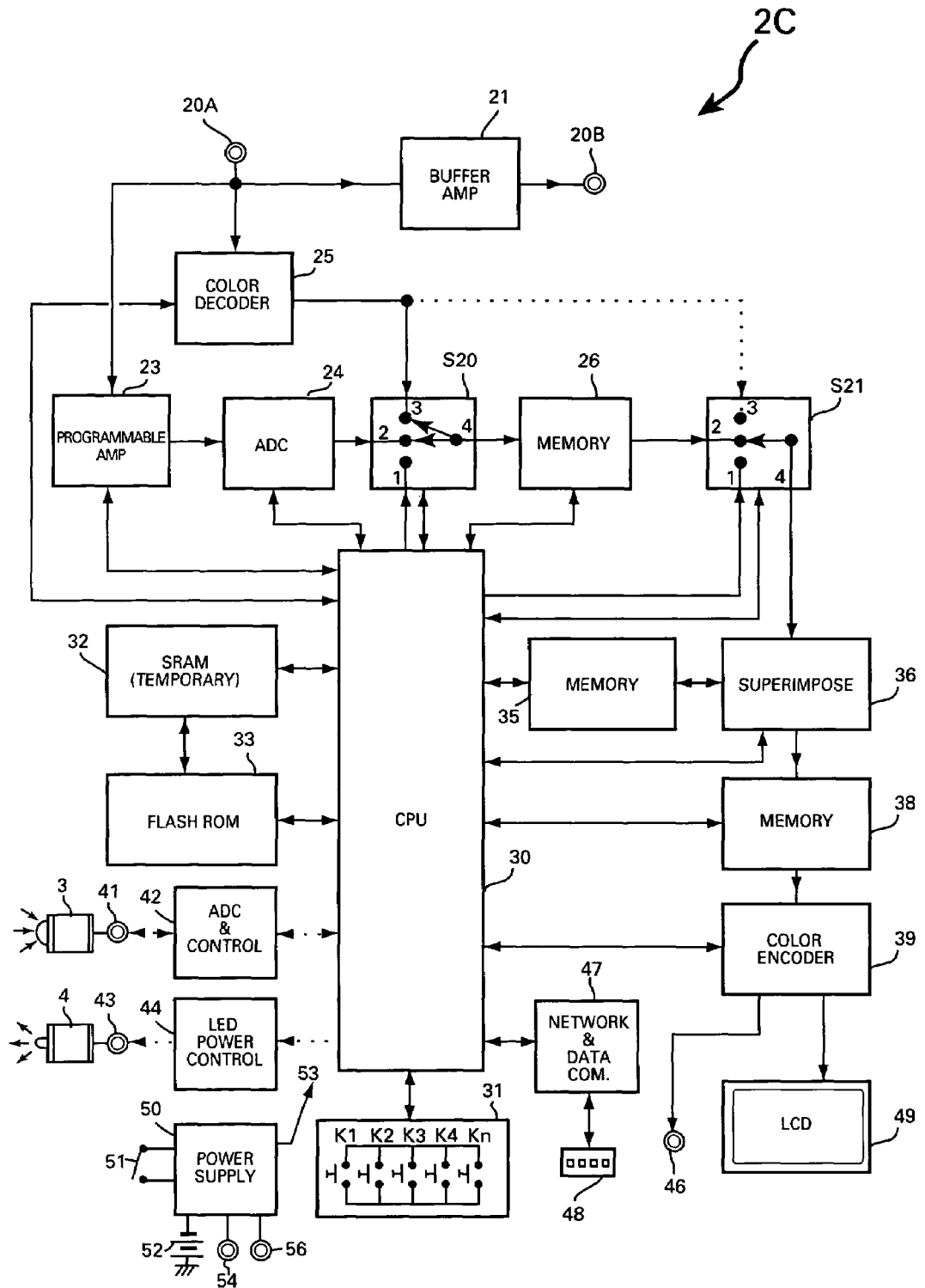
FIG. 10 is a block diagram shown in FIG. 7 showing the active circuits for measuring signal levels and other signal elements for processing, superimposing and displaying of waveforms, graphs, and vectors onto the display.

Shown in FIG. 10 is the tester 2 set to waveform mode 2C for measuring the inputted video signal in mV and in IRE values and for outputting the measured values and displaying the signal level in a graph known as waveform. In the waveform mode the tester 2 provides for superimposing the video signal waveform 68W shown in the display 68 of FIG. 6 and/or numeric Lux value 67L AND 67ML onto said scene display generated by the camera under test as shown in the display 67 of FIG. 6. Further, the superimposing circuit can be fed with a corresponding grid display 68G, selected from a multi grid programs stored in the flash memory 33, having Y axis corresponding to the signal levels in mV and/or IRE and with a time base in the X axis, such as time base 68T, for either the horizontal or vertical period units or fractions thereof.

The well known IRE term (defined by the Institute of Radio Engineers) is the standard signal unit for broadcasting television signal. The well known analogue video signal for the NTSC broadcast signal, as published by IRE and by all international organizations, is 1V P-P that includes 0.714V video and 0.286V sync signals (the CCIR values are 0.7V video and 0.3V sync). The IRE scale for the 1V P-P is equal to 140 IRE, wherein 100 IRE represents 0.714V video (maximum luminance signal) and the 40 IRE represents 0.286V sync level. The whole IRE scale covers 160 IRE as applied to zero carrier of a broadcast color signal, however for specifying signal levels relating to video and cameras sensitivity a maximum of 100 IRE is used, wherein 100 IRE is equal to maximum video signal of 0.714V P-P, and each IRE represent video signal level of 7.14 mV.

The measuring of a camera sensitivity, as defined by SMPTE which govern the video broadcast industry standards, calls for exposing the camera to 2000 Lux of uniformly lighted white light and for closing the iris of the lens (increase the aperture f number) gradually until the camera signal outputs non saturated 100 IRE of video signal. The specification in the data sheet of a broadcast camera will indicate the f number at which a non-saturated and non-amplified signal level of 100 IRE is measured. Because this measurement is complex and not simple to comprehend by users of security systems and amateur photographers, the sensitivity specifications of cameras in the security or the consumer market stipulate a Lux value at which the camera will generate 100 IRE of video signal when used with a stipulated f number (of a lens).

However, because the generated signals by the pickup device are amplified by an AGC amplifier (all cameras incorporate AGC) the 100 IRE value can be obtained by a very high gain AGC amplifier, even though the non amplified pickup device signals can be far lower, such as, for example, only 5

IRE for the specified sensitivity in Lux. Further, the sensitivity specification of some cameras are conditioned on generated signal of only 20 IRE or even 10 IRE for a given extremely low Lux number such as 0.001 Lux, which causes confusion.

Therefore, by superimposing the video signal waveform measured in IRE or mV units onto the display of a picture taken by the camera under test will provide the user with unambiguous picture reality, with illumination in Lux and signal in mV and IRE values onto the displayed picture. Moreover, the superimposing circuit provides for highlighting the selected horizontal line 68H shown in the display 68 of FIG. 6, or period of the display for which the signal waveform is superimposed. The decoder 25 shown in FIG. 10 feeds its output signal which includes the separated sync signal to the CPU 30. By counting and/or timing the vertical and the horizontal pulses the CPU 30 can identify each and every horizontal line or vertical period. The CPU 30 therefore outputs to the superimpose circuit 36 and to the color encoder circuit 39 highlight signal for highlighting the identified line or lines of the display, or for highlighting the vertical period of the stored waveform, corresponding to a display stored in the memory 38.

Shown in FIG. 10 the signal path of the camera under test connected to the connector 20A is fed to the color decoder 25 and to the programmable amplifier 23. The output of the color decoder is fed through the terminal 3 and the output terminal 4 of the routing switch S21 and through the superimposing circuit 36 to the memory circuit 38. The output of the programmable amplifier 23 is fed through an analog to digital converter 24 to the CPU 30 and through terminals 2 and 4 of the routing switch S20 to the memory 26. The analog to digital converter circuit 24 feeds digital data corresponding to the video signal level of the camera under test to the CPU for processing the data and feeding a graph on the basis of the signal level and a selected time base, as selected by the select keys 31. The programmable amplifier 23 is fed with control signals from the CPU, for providing controlled and programmed amplified signal levels commensurating with a grid select display, in IRE or mV values, such as 100 IRE, 5 IRE, 20 IRE, 10 IRE and/or 700 mV P-P, 500 mV P-P, 300 mV P-P, etc, similar to the way a well known vectroscope display is selected. The analog to digital converter 24 shown in FIG. 10 as a separate circuit, similar to the analog to digital converter 42, may not be used because the CPU 30 contain analog to digital converter circuit and therefore the output of the programmable amplifier 23 can be fed directly to an input of the CPU 30.

The well known waveform graph 68W shown in the display 68 of FIG. 6 commonly represents the measured signal in IRE or mV of a single selected horizontal line, selected from the field or a frame of the signal generated by the camera under test. However, by changing the time base of the graph display to a fraction or a portion of an horizontal line or to multiple horizontal lines, it is possible to display a waveform graph for a selected multiple horizontal lines of the signal with the selected time base 68T is displayed as well. Since the waveform is superimposed onto the picture as generated by the camera under test, the present invention provides for highlighting the single selected horizontal line 68H, or the group of horizontal lines of the displayed picture of which the waveform represents their signal level in IRE and/or mV.

On the other hand, when the time base of the waveform is selected to multiple vertical periods, the present invention provide for storing the displayed picture into the memory 38 and highlighting the vertical period of the waveform, not shown, which is the waveform of the entire displayed picture that is stored in the memory 38 of the circuit display chain.

By this the display of the picture generated by the camera under test can include the many different Lux values of the different objects of the scene, the face plate illumination value, the overall illumination graph, the signal waveform in IRE and/or mV value and the highlighted horizontal line or period for which the signal waveform is displayed, giving the user comprehensive data pertaining the illumination and the signal levels, all superimposed onto the display of a picture generated by the camera under test with the selected lens.

Another very important measurement of the camera basic performances is the signal to noise ratio (S/N). The measurement standard for broadcast cameras (by SMPTE) for signal to noise ratio (S/N) calls for measuring the noise when the camera is exposed to 2000 Lux of uniformly lit light box with the iris of the lens set such that a flat 100 IRE, non saturated signal is obtained. During S/N measurement all the signal amplifiers such as the AGC amplifier and video signal processing circuit, such as gamma circuit and others are all switched off. By such setup, the noise is riding on a clean, flat level of 100 IRE or 0.714 of video signal and the signal to noise ratio can be measured with accuracy. The measured signal to noise ratio is specified in dB, such as 46 dB or 48 dB.

Other S/N measurement method is carried by two steps, first the measuring of the peak white signal of a camera positioned against 2000 Lux lighted test chart (with all the video signal amplifiers and processors switched off), proceeded by comparing the measured peak white signal to a black level noise, measured when the lens is capped, e.g. with no light penetrating the pickup device.

The known S/N measurements however do not provide a practical information as to the S/N of a camera when the camera's high gain AGC amplifier and other video signal processing circuits are active and are generating internal noise, particularly under low light conditions. Because of this, the users of cameras do not understand at all such an important item of specifications, even though the digital recordings of camera signals are greatly affected by noise.

The method and the apparatus of present invention provides for measuring the S/N during a single selected H line 68T, (which is the highlighted line 68H in FIG. 11A) by placing white reflecting screen 6N shown in FIG. 3 inside the measured scene for measuring both, the noise riding on top of, and the level of the "white" signal that corresponds to the light reflected by said white reflecting screen 6N and comparing the level of the noise measured with the level of said "white" signal, and for generating the actual measured S/N figure in dB and for superimposing the S/N value 75 of FIG. 11A into the display, to provide real practical means for the user to comprehend the meaning of S/N value.

Said reflecting screen 6N is an highly reflecting white screen, such as used for projecting movies or displaying projected PC data, having reflecting ratio of 79% or 90% or higher. The screen 6N can be made of soft fabric or solid materials and it is preferable to provide such reflecting screen that can be rolled or folded, so as to be portable. As the reflecting screen of this invention may cover only a portion of the entire scene, it is preferable to provide the screen 6N with two black vertical borderlines 6NB shown in FIG. 1 for marking the S/N measurement borders onto the signal waveform superimposed onto the display.

The borderlines 6NB are needed to limit the measurement of the noise level and the reflected "white" signal to the time period of the waveform, corresponding to the said "white" signals. The borderlines are therefore needed to distinguish said "white" signal from other signals of the waveform, because it is not possible to identify noise from a random live video signal and the only way to separate the noise from the video signal is by having the noise 71 riding on top of a leveled white signal 72 as shown in FIG. 11A or to measure the "white" signal and compare it to a noise signal generated by the camera when the lens is capped.

In practice the reflecting screen 6N or 6C will not cover the entire observed scene as observed by the camera 5 under test, therefore the present invention provides a program for setting left and right borders onto the waveform corresponding to said border lines 6NB for limiting the measurement of the S/N to the signal generated by the reflected light from said reflecting screen. Accordingly the CPU 30 includes a program for setting and superimposing borderlines 73 onto the display and the superimposed waveform, commensurating with the actual borderlines 6NB of said reflecting screen by using the left-right-up-down keys 31. By this, the S/N measurement is confined to the signal generated by the reflected light from the white reflecting screen 6N between its border lines 6NB, and is not influenced by other signals generated by a reflected light outside the screen as shown in FIG. 11A. Once the borderlines 73 are set onto the waveform 68W the CPU 30 processes, compare and calculated the measured noise 71 riding on top of and the signal level 72 of the reflected white light of the waveform portion between the borderlines 73 only and output to the superimpose circuit the S/N value in dB 75.

By superimposing the measured S/N value in dB along the illumination values in Lux, the signal levels and waveform values in mV and IRE units onto the actual display of the scene, generated by a camera under test, the user can better evaluate and comprehend the performance of the camera.

The resolution of a camera is another fundamental item of the camera specification and it is commonly specified in TVL or TeleVision Lines, such as 240 TVL or 320 TVL. The lines referred to are not the horizontal scanning lines of the television system. The TV lines are the numbers of vertical black/white lines that are visibly resolved by the camera and are not displayed on a monitor as a "gray" or shaded area.

The common method for measuring the resolution of a camera in TVL is to position the camera against highly illuminated resolution test chart such as the resolution chart 6R or the well known RETMA chart 6S shown in FIG. 6, and review the chart displayed on a monitor for identifying the resolving power of the camera (with a lens). The limiting resolution will be the narrowest line that is visibly resolved. The resolution can be further verified through the video signal waveform, wherein the resolution limit is the given frequency or TVL signal, out of the sweep frequency or step frequency signals corresponding to the resolution chart, is attenuated to 40% level versus the signal level measured at 50 TVL resolution.

A standard test chart for measuring resolution in a laboratory environment is illuminated by 2000 lux and generates sharp edge signals with minor accompanying noise. Moreover, the 50 TVL based signal i.e. the reference 100% level, will be close to 100 IRE. In contrast a resolution chart illuminated by 10 lux or below will result with rounded signal edges and with substantially generated noise, this will affect mostly the higher resolution. Further under lower illuminations the 50 TVL signal level will be far lower than the 100 IRE and thus, the attenuated higher frequency signal, attenuated to below 40% in ratio to the 50 TVL, will equal the noise level and thus, reducing the overall resolution of the camera.

Therefore, to correctly measure the camera resolution in the field, the present invention provides for the use of a sweep frequency or step frequency screen 6R, calibrated in TVL, for placing the screen into the scene viewed by the camera under test as shown in FIG. 3, for measuring the camera's resolution in the field, under the actual illumination of the scene the camera is intended for. The camera should be positioned at a distance such, that the horizontal width of the display will cover the exact width of the entire sweep frequency, step frequency 6R or of the combined chart 6C or screen. With the grid 68G and the waveform 68W superimposed onto the display 80 for verifying the resolution in TVL, e.g. 40% level 81 versus the 100% reference signal level of 50 TVL 82 as shown in FIG. 11B, the CPU will calculate and display the resolution measurement in TVL 83 along with the illumination value in Lux 67 ML.

Another item of specification of a camera is the camera spectrum. The measurement of spectrum differs from the waveform measurement by the X axis of the measuring process, wherein the waveform X axis is time period (H line(s) or V period(s)) and the spectrum graph's X axis is a band of frequency sweep, as shown in FIG. 11C. The grid for the spectrum graph, according to the present invention, can be superimposed on the basis of frequencies and/or TVL and by this the precision of the measuring and reviewing of the camera performances, including the resolution is greatly enhanced, because the level value of the signals at 50 TVL and all other TVL values are precisely marked.

Here too however, the measuring and specifying the camera's spectrum under good illumination such as 2,000 lux does not reflect upon the spectrum of a camera exposed to low level of illumination. Under low illumination level the high gain AGC amplifiers is operated at its full gain in combination with other processing circuitries, all of which cause harmonics, noises and other unwanted non linear performances. For this purpose, here too, the present invention provides for superimposing frequency spectrum graph onto the display of a scene as generated by the camera under test, enabling the user to better understand the camera performances. Such spectrum graph of a signal of a camera positioned against sweep frequency test chart 6R or against the combined chart 6C or screen clarifies the linearity of the camera processing and amplifying circuits and the noise that they generate, along with the overall camera performances including resolution, contrast and color levels.

The CPU 30 of the tester 2 shown in FIG. 12 is programmed to generate a sweep frequency, such as 10 Hz up to 10 MHz within a selected H line period 68T of the camera signal under test, e.g. within time period of about 50 µ sec. The generated sweep frequency is used for measuring the response and spectrum of signals generated by the camera 5 under test and for forming of the X axis of the spectrum graph, shown in FIG. 11C.

The measuring of the spectrum, according to the present invention, can be selected to any portion of the waveform 68W of a given selected horizontal line period, for example it can be limited to measure the spectrum of the signal between the 50 TVL and the 40% of the signal, representing the limiting resolution shown in FIG. 11B. Such spectrum graph offers far more accurate and non objective viewing of the resolution testing result.

To limit the spectrum measurement to a given portion of the H line the tester 2 provides for setting borderlines 73, shown in FIG. 11A, freely throughout the waveform 68W prior to switching over to the spectrum mode. For identifying the portion 93 of the selected line 68T (shown as H-44 in FIG. 11C) for which the spectrum measurement apply. During the spectrum test mode only said portion 93 of the line is highlighted as shown in FIG. 11C.

The combined chart 6C shown in FIG. 1 offer the advantages of measuring different important items of the camera performance including S/N (highly reflecting white surface), resolution 62, contrast (gray scale 64), color vectors (color chart 63), spectrum and more by shifting the selected line to any of the chart's items as viewed by the camera.

The accuracy of the chrominance (color) signals, and the chrominance signal level depends on the camera pick up device and the processing circuitry, but it is greatly influenced by light levels and particularly on the type of the illuminators used, the spectrum of the illuminators and the color temperature of the illuminated environment of a scene. Vectroscope, which is well known test equipment to measure color signal accuracy and color signal levels is commonly used in laboratory environment for measuring the chrominance, e.g. the color signals accuracies under well controlled illumination environment. None of the well known vectroscopes provide for superimposing color vectros onto the display of a scene as generated by a camera under test.

The color signal decoder 25 of FIG. 10 decodes and generate all the data, including levels and vectors, pertaining the chrominance signals, such as the chrominance signal of NTSC, PAL or digital video signals, include any of the well known J-PEG or M-PEG compression variations, such as J-PEG, MJ-PEG, M-PEG, M-PEG2, M-PEG4 or H263 and the like. The color signal decoder feeds the data to the CPU 30, which is programmed to process the data into a well known vectroscope display, for superimposing the color vectros 101 onto the scene display 100 generated by the camera under test shown in FIG. 11D. This will provide the user with clear unambiguous details pertaining the color accuracy and color signal levels generated by the camera under test, for the specific scene the camera is intended for and under the actual illumination levels 67ML and color temperature. This provides the user with clear references for evaluating the effects of different illuminators and illumination environment upon the actual displayed picture and the shifting vectors of the color signals.

For providing a practical, small size and light weight tester for the many described different measurement and for generating grids and test charts for other testing purposes the apparatus of the present invention uses high speed, powerful CPU processor and high speed, high capacity field or frame memories 26, 35 and 38, along with high speed and capacity flash ROM and SRAM devices and employs FPGA device which is formed into different circuit combinations by a software program, making the tester 2 very flexible and highly practical for field testing and for laboratories applications.

Moreover, the high capacity and fast memories along with the fast powerful CPU 30 enable the tester 2 to store comprehensive software program for generating color chart 63, Retma chart 61, sweep frequency or resolution chart 62, gray scale chart 64 shown in FIG. 6 and other well known charts used in the television industry such as step frequencies, cross hatch (not shown). The charts can be individually recalled for display on the LCD screen 49 and for generating chart signals through the connector 46 for testing monitors, recorders such as VHS, DVD or other digital recorders and for combining chart signals along with the signals of the camera under test for the purpose of testing the system other devices and/or the cabling connecting the camera to a control center etc. The CPU 30 also provides for propagating all the test data to the PC 8 connected to the tester through the connector 48.

Further, the tester 2 of the present invention provides for feeding the display's data with all the superimposed data, along with other particular of the measurements, such as tables and lists of the measured data to a printer (not shown) or to the PC 8 for storing and/or for printing out the measurement results. The PC 8 may include a program for remotely controlling the tester 2 of the present invention and/or for generating reports, graphs, waveforms, vectors and other data pertaining the tested camera in details.

Also, the feeding of the display signals to a remote monitor via the connector 46 offer several advantages. One is to provide better resolution displays by using large size monitor versus the small LCD size used with a portable tester having inherently lower resolution. Another is to prevent the tester display from generating light into a very dark or total darkness scene under test. By all the above, it become clear that the method and apparatus of the versatile tester 2 of the present invention for measuring light and camera performances offers the means to verify the very important specification items of camera performances.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for measuring a performance of a camera undergoing testing by a camera tester, distinct from said camera undergoing testing, said tester includes a tester body, and at least one peripheral accessory for use in combination with said tester for processing said testing and selected from a group comprising an illumination sensor, a calibrated light device, a chart and combinations thereof, said performances selected from a group comprising of sensitivity, usable sensitivity, picture signal level, full video signal level, IRE, signal to noise ratio, resolution, spectrum, color vector, color signal level and combinations thereof;

said camera undergoing testing includes signal output connector for outputting a camera signal generated by said camera undergoing testing to said tester on the basis of said camera internal circuits, sensing devices and programs, irrespective of said tester; said tester body including a camera signal input connector, a monitor, superimposing circuit, processing circuit and measurement circuit for outputting measurements selected from a group consisting of alphanumeric characters, waveforms, graphs, vectors and combinations thereof pertaining said performances, comprising the steps of:

connecting said output connector of said camera undergoing testing to said input connector of said tester body and positioning said camera away from a scene selected from a group consisting of things, objects, premises, interiors, exteriors, landscape, horizon, scrolls, charts and combinations thereof for observing said scene and for generating a scene signal;

displaying said scene on the basis of said scene signal onto said monitor;

superimposing said measurements onto said scene displayed by said monitor into positions selected from a group comprising at least one detected position of a portion of said scene signal, highlighting at least one detected position of said scene signal, at least one position pertaining to the whole of said scene signal and at least one position pertaining to a sequencing measurements.

2. The method for measuring a performance of a camera undergoing testing according to claim 1 wherein said performances further comprising illumination items selected from a group comprising of illumination, minimum illumination, usable illumination, minimum usable illumination, scene illumination, minimum scene illumination, usable scene illumination, minimum usable scene illumination, face plate illumination, minimum face plate illumination, usable face plate illumination, minimum usable face plate illumination and combinations thereof, said scene further comprises light box and illuminators and said illumination sensor includes a connecting cord and visual spectrum filter, said method further comprising the steps of:

connecting said illumination sensor to said tester body;

placing said illumination sensor away from said camera and from said tester body into a position within said scene for sensing the actual illumination at said scene in at least one said position;

measuring at least one of said illumination items for displaying the measured illumination items via at least one of a display mode selected from a group comprising of adding said measured illumination items to said measurements superimposed onto said scene, displaying said measured illumination items onto said monitor outside said scene and displaying only said measured illumination items onto said monitor.

3. The method for measuring a performance of a camera undergoing testing according to claim 2 wherein said illumination sensor is placed sequentially into different positions within said scene for measuring the actual illumination in said different positions for superimposing more than one said illumination items onto said different positions of said scene displayed by said monitor.

4. The method for measuring a performance of a camera undergoing testing according to claim 2 wherein said visual spectrum filter is interchangeable with filters and mount selected from a group consisting of UV, IR, lens mount and combinations thereof and wherein said measurements of illumination items are generated for visible spectrum, UV and IR independently.

5. The method for measuring a performance of a camera undergoing testing according to claim 2 wherein said tester body is connected via a cord to said calibrated light device for emitting visual spectrum light and for verifying the accuracy of said visual spectrum illumination measurements or for illuminating said scene with precise radiated light.

6. The method for measuring a performance of a camera undergoing testing according to claim 4 wherein said tester body is connected via a cord to at least one of calibrated UV and IR radiators, and employing a matching said UV and IR filters for verifying the accuracy of said measurements of said illumination items within the UV and IR wavelength or for radiating said scene with a precise UV or IR radiation.

7. The method for measuring a performance of a camera undergoing testing body according to claim 1 wherein said tester body generates programmed chart signals including charts selected from a group consisting of color chart, Retina chart, gray scale chart, resolution chart, sweep frequency chart, step frequency chart and cross hatch chart.

8. The method for measuring a performance of a camera undergoing testing according to claim 1 wherein said tester body is one of a circuit built into a PC and a self contained circuit including at least one connector selected from a group comprising monitor-out connector for displaying selectively said scene and said scene superimposed with said measurements onto a remote monitor and a data connector for feeding said measurements and said display signal to a separate PC and for selectively instructing said separate PC to process, display and print said scene superimposed with said measurement, said scene only and said measurements only.

9. The method for measuring a performance of a camera undergoing testing according to claim 2 wherein said tester body is one of a circuit built into a PC and a self contained circuit including at least one connector selected from a group comprising monitor-out connector for displaying selectively said scene and said scene superimposed with said measurements onto a remote monitor and a data connector for feeding said measurements and said display signal to a separate PC and for selectively instructing said separate PC to process, display and print said scene superimposed with said measurement, said scene only and said measurement only.

10. The method for measuring a performance of a camera undergoing testing according to claim 6 wherein said tester body further includes a memory for storing sequentially scene signals and their measurement signals measured under different illumination and said radiation levels, said method further comprising the steps of:

playing back the stored scene signals and said measurement signal;

selecting said display mode for displaying said scene and said measurements; and comparing said performances under said different illumination and different said radiation levels including a comparison selected from day and night observation.

11. An apparatus for measuring a performance of a camera undergoing testing by a camera tester, said tester includes a tester body, and at least one peripheral accessory for use in combination with said tester for processing said testing and selected from a group comprising an illumination sensor, a calibrated light device, a chart and combination thereof, said performances selected from a group comprising of sensitivity, usable sensitivity, picture signal level, full video signal level, IRE, signal to noise ratio, resolution, spectrum, color vectors, color signal level and combinations thereof on the basis of an output signal fed from said camera undergoing testing to said tester and wherein said camera undergoing testing generates said output signal irrespective of said test, said camera tester comprising:

said tester body including a signal processing, measuring and superimposing circuits, a monitor and an input connector for connecting said tester body to an output connector of said camera undergoing testing for receiving said output signal;

said camera is positioned for said testing away from a scene selected from a group comprising of things, objects, premises, interiors, exteriors, landscape, horizon, scrolls, charts and combinations thereof for observing said scene and for generating and outputting a scene signal through said output connector;

said tester body processes and measures the received scene signal for generating a display signal selected from a group comprising of said scene signal and measurement signals including alphanumeric characters, waveforms, graphs, vectors and combinations thereof;

said tester body further includes select keys for selecting and connecting said display signal to said monitor and for activating and selectively commanding said superimposing circuit to superimpose said measurement signals onto said scene displayed by said monitor into positions selected from a group comprising at least one detected position of a portion of said scene signal, highlighting at least one detected position of said scene signal, at least one position pertaining to the whole of said scene signal, at least one position pertaining to a sequencing measurements and combinations thereof.

12. The apparatus for measuring a performance of a camera undergoing testing according to claim 11 wherein said performances further comprising illumination items selected from a group comprising of illumination, minimum illumination, usable illumination, minimum usable illumination, scene illumination, minimum scene illumination, usable scene illumination, minimum usable scene illumination, face plate illumination, minimum face plate illumination, usable face plate illumination, minimum usable face plate illumination and combinations thereof;

said scene further comprises light boxes and illuminators and said illumination sensor includes a visual spectrum filter and a connecting cord for placing said illumination sensor away from said camera and from said tester body into a position within said scene for measuring the actual illumination at said scene in at least one said position;

said select keys enables the selection and control of the measuring of said illumination items and the displaying of the measured illumination items via a display mode selected from a group comprising of adding said measured illumination items to said measurement signals superimposed onto said scene, displaying said measured illumination items onto said monitor outside said scene and displaying only said measured illumination items onto said monitor.

13. The apparatus for measuring a performance of a camera undergoing testing according to claim 12 wherein said illumination sensor is placed sequentially into different positions within said scene for measuring the actual illumination in said different positions for superimposing more than one said illumination items onto said scene displayed by said monitor.

14. The apparatus for measuring a performance of a camera undergoing testing according to claim 12 wherein said visual spectrum filter is interchangeable with filters and mount selected from a group consisting of UV, IR, lens mount and combinations thereof and wherein said measurements of illumination items are generated for visible spectrum, UV and IR independently.

15. The apparatus for measuring a performance of a camera undergoing testing according to claim 12 wherein said tester body is connected via a cord to said calibrated light device for emitting visual spectrum light and for verifying the accuracy of said visual spectrum illumination measurements or for illuminating said scene with precise radiated light.

16. The apparatus for measuring a performance of a camera undergoing testing according to claim 14 wherein said tester body is connected via a cord to at least one of a calibrated UV and IR radiators and employs a matching said UV and IR filters for verifying the accuracy of said measurements of said illumination items within the UV and IR wavelength or for radiating said scene with a precise UV or IR radiation.

17. The apparatus for measuring a performance of a camera undergoing testing according to claim 11 wherein said tester body generates programmed chart signals including charts selected from a group consisting of a color chart, Retma chart, a gray scale chart, a resolution chart, a sweep frequency chart, a step frequency chart and a cross hatch chart.

18. The apparatus for measuring a performance of a camera undergoing testing according to claim 11 wherein said tester body is one of a circuit built into a PC and a self contained circuit including at least one connector selected from a group comprising monitor-out connector for displaying selectively said scene and said scene superimposed with said measurements onto a remote monitor and a data connector for feeding said measurements and said display signal to a separate PC and for selectively instructing said separate PC to process, display and print said scene superimposed with said measurement, said scene only and said measurements only.

19. The apparatus for measuring a performance of a camera undergoing testing according to claim 12 wherein said tester body is one of a circuit built into a PC and a self contained circuit including at least one connector selected from a group comprising monitor-out connector for displaying selectively said scene and said scene superimposed with said measurements onto a remote monitor and a data connector for feeding said measurements and said display signal to a separate PC and for selectively instructing said separate PC to process, display and print said scene superimposed with said measurement, said scene only and said measurement only.

20. The apparatus for measuring a performance of a camera undergoing testing according to claim 16 wherein said tester body further includes a memory for storing sequentially scene signals and their measurement signals measured under different illumination and said radiation levels; wherein said select keys control and command the playback of the stored scene signals and said measurement signals and the displaying of said scene and said measurements for comparing said performances under said different illumination and different said radiation levels, including a comparison selected from day and night observation.

* * * * *